(12) United States Patent
Jin et al.

(10) Patent No.: US 8,279,647 B2
(45) Date of Patent: Oct. 2, 2012

(54) UNIVERSAL THREE PHASE CONTROLLERS FOR POWER CONVERTERS

(75) Inventors: Taotao Jin, Irvine, CA (US); Keyue Smedley, Aliso Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/882,056

(22) Filed: Sep. 14, 2010

(65) Prior Publication Data

US 2011/0032735 A1    Feb. 10, 2011

Related U.S. Application Data

(63) Continuation of application No. 12/346,465, filed on Dec. 30, 2008, now Pat. No. 7,796,411, which is a continuation of application No. 10/595,461, filed as application No. PCT/US2004/036542 on Nov. 1, 2004, now Pat. No. 7,471,529.

(51) Int. Cl.
  *H02M 5/42*  (2006.01)
  *H02M 7/04*  (2006.01)
(52) U.S. Cl. ............................. 363/89; 363/87; 363/92
(58) Field of Classification Search .................. 363/39, 363/44–48, 82, 84, 87–92, 125–128
  See application file for complete search history.

(56) References Cited

U.S. PATENT DOCUMENTS

| | | | |
|---|---|---|---|
| 4,941,079 A | | 7/1990 | Ooi |
| 4,995,104 A | * | 2/1991 | Gitlin ............................ 370/201 |
| 5,278,490 A | | 1/1994 | Smedley |
| 5,315,585 A | * | 5/1994 | Iizuka et al. ................... 370/289 |
| 5,430,639 A | * | 7/1995 | Takahashi ...................... 363/124 |
| 5,502,630 A | | 3/1996 | Rokhvarg |
| 5,636,106 A | * | 6/1997 | Batarseh et al. ................ 363/16 |
| 5,672,957 A | | 9/1997 | Bergmann |
| 5,729,102 A | * | 3/1998 | Gotou et al. ............. 318/400.13 |
| 5,784,269 A | | 7/1998 | Jacobs et al. |
| 5,793,622 A | | 8/1998 | Dahler et al. |
| 5,936,855 A | | 8/1999 | Salmon |
| 6,046,915 A | | 4/2000 | Jacobs et al. |

(Continued)

FOREIGN PATENT DOCUMENTS

DE         101 53 738 A      5/2002

(Continued)

OTHER PUBLICATIONS

B. Singh et al., "*Active Power Filter with Sliding Mode Control*", Nov. 1997; IEEE Proc.-Gener. Transm. Distrib., vol. 44, No. 6, pp. 564-568.

*Primary Examiner* — Adolf Berhane
*Assistant Examiner* — Emily Pham
(74) *Attorney, Agent, or Firm* — Dickstein Shapiro LLP; Kenneth S. Roberts

(57) ABSTRACT

The systems and methods described herein provide for a universal controller capable of controlling multiple types of three phase, two and three level power converters. The universal controller is capable of controlling the power converter in any quadrant of the PQ domain. The universal controller can include a region selection unit, an input selection unit, a reference signal source unit and a control core. The control core can be implemented using one-cycle control, average current mode control, current mode control or sliding mode control and the like. The controller can be configured to control different types of power converters by adjusting the reference signal source. Also provided are multiple modulation methods for controlling the power converter.

12 Claims, 29 Drawing Sheets

U.S. PATENT DOCUMENTS

| | | |
|---|---|---|
| 6,137,700 A | 10/2000 | Iida et al. |
| 6,160,725 A | 12/2000 | Jansen |
| 6,239,995 B1 | 5/2001 | Weng et al. |
| 6,249,108 B1 | 6/2001 | Smedley et al. |
| 6,297,980 B1 | 10/2001 | Smedley et al. |
| 6,466,465 B1 | 10/2002 | Marwali |
| 6,545,887 B2 * | 4/2003 | Smedley et al. ............ 363/89 |
| 6,760,239 B2 | 7/2004 | Schierling et al. |
| 6,768,655 B1 * | 7/2004 | Yang et al. ............ 363/21.01 |
| 6,861,897 B1 * | 3/2005 | Cheng et al. ............ 327/552 |
| 6,879,062 B2 | 4/2005 | Oates |
| 6,933,709 B2 | 8/2005 | Chapuis |
| 7,012,819 B2 * | 3/2006 | Feldtkeller ............ 363/21.01 |
| 2003/0128563 A1 | 7/2003 | Romero |

FOREIGN PATENT DOCUMENTS

| | | |
|---|---|---|
| EP | 0 660 498 A | 6/1995 |
| FR | 2 679 079 A | 1/1993 |
| JP | 2003-174779 A | 6/2003 |
| WO | WO 99/49559 A | 9/1999 |

* cited by examiner

WHERE j DENOTES a, b AND c

WHERE j DENOTES a, b AND c

WHERE j DENOTES a, b AND c

WHERE j DENOTES a, b AND c

<LAGGING>

<LEADING>

WHERE j DENOTES a, b AND c

SINUSOIDAL CURRENTS

WHERE j DENOTES a, b AND c

| REGION 611 | $d_p$ | $d_n$ | $V_p$ | $V_b$ |
|---|---|---|---|---|
| -30°~30° | $S_c$ | $S_b$ | $V_c$ | $-V_b$ |
| 30°~90° | $S_a$ | $S_b$ | $V_a$ | $-V_b$ |
| 90°~150° | $S_a$ | $S_c$ | $V_a$ | $-V_c$ |
| 150°~210° | $S_b$ | $S_c$ | $V_b$ | $-V_c$ |
| 210°~270° | $S_b$ | $S_a$ | $V_b$ | $-V_a$ |
| 270°~330° | $S_c$ | $S_a$ | $V_c$ | $-V_a$ |

| REGION 611 | $d_p$ | $d_n$ | $V_p$ | $V_n$ |
|---|---|---|---|---|
| -30°~30° | $T_{cn}$ | $T_{bp}$ | $V_c$ | $-V_b$ |
| 30°~90° | $T_{an}$ | $T_{bp}$ | $V_a$ | $-V_b$ |
| 90°~150° | $T_{an}$ | $T_{cp}$ | $V_a$ | $-V_c$ |
| 150°~210° | $T_{bn}$ | $T_{cp}$ | $V_b$ | $-V_c$ |
| 210°~270° | $T_{bn}$ | $T_{ap}$ | $V_b$ | $-V_a$ |
| 270°~330° | $T_{cn}$ | $T_{ap}$ | $V_c$ | $-V_a$ |

| REGION 611 | $d_p$ | $d_n$ | $V_p$ | $V_n$ |
|---|---|---|---|---|
| -30°~0° | $S_b$ | $T_{ap}$ | $-V_b$ | $-V_a$ |
| 0°~30° | $S_c$ | $T_{an}$ | $V_c$ | $V_a$ |
| 30°~60° | $S_a$ | $T_{cn}$ | $V_a$ | $V_c$ |
| 60°~90° | $S_b$ | $T_{cp}$ | $-V_b$ | $-V_c$ |
| 90°~120° | $S_c$ | $T_{bp}$ | $-V_c$ | $-V_b$ |
| 120°~150° | $S_a$ | $T_{bn}$ | $V_a$ | $V_b$ |
| 150°~180° | $S_b$ | $T_{an}$ | $V_b$ | $V_a$ |
| 180°~210° | $S_c$ | $T_{ap}$ | $-V_c$ | $-V_a$ |
| 210°~240° | $S_a$ | $T_{cp}$ | $-V_a$ | $-V_c$ |
| 240°~270° | $S_b$ | $T_{cn}$ | $V_b$ | $V_c$ |
| 270°~300° | $S_c$ | $T_{bn}$ | $V_c$ | $V_b$ |
| 300°~330° | $S_a$ | $T_{bp}$ | $-V_a$ | $-V_b$ |

UNIVERSAL THREE PHASE CONTROLLERS FOR POWER CONVERTERS

CROSS-REFERENCE TO RELATED APPLICATIONS

This application is a continuation of application Ser. No. 12/346,465, filed Dec. 30, 2008, now U.S. Pat. No. 7,796,411, which is a continuation of application Ser. No. 10/595,461 filed Jan. 12, 2007, now U.S. Pat. No. 7,471,529, which is a 371 application of PCT Application Serial No. US2004/036542 filed Nov. 1, 2004, which applications are incorporated herein by reference. This application also claims the benefit of Provisional Application Ser. No. 60/516,247 filed Oct. 31, 2003, which application is incorporated herein by reference.

FIELD OF THE INVENTION

The invention relates generally to the field of power converter controllers, and more particularly to systems and methods for the control of power converters with a controller.

BACKGROUND INFORMATION

Switched power converters are circuits having numerous applications in distributed generation (DG) power systems. FIGS. 1-4 depict four types of commonly used switched power converters. FIG. 1A depicts a two level power factor corrected (PFC) rectifier 102. Here, PFC rectifier 102 is used to shape the line currents $i_a$, $i_b$ and $i_c$ to be proportional to the corresponding line voltages $V_a$, $V_b$ and $V_c$. FIG. 1B depicts an example graph of the line voltage versus time, and the line current versus time, where j is used to denote a, b or c. Here, it can be seen that the line current $i_j$ is kept proportional to the line voltage $V_j$.

FIG. 2A depicts a two level active power filter (APF) 104, which is another example power converter. Here, APF 104 is used to generate anti-harmonic and reactive currents to suppress or cancel harmonics in the power lines. FIG. 2B depicts an example graph of the system line voltage, $V_j$, versus time. FIG. 2C depicts an example graph of the line current, $i_j$, versus time prior to adjustment by the APF 104. FIG. 2D depicts an example graph of the anti-harmonic or reactive current, $i_{cj}$, versus time and FIG. 2E depicts an exemplary graph of the resulting line current, $i_{lj}$, after adjustment by the APF 104.

FIG. 3A depicts a two level pulse width modulated (PWM) static volt-ampere-reactive (VAR) compensator (SVC) 106, which is another example of a power converter. Here, SVC 106 is used to generate a 90 degree phase offset, either leading or lagging, of the line current from the line voltage so as to control power flow from a power grid. The power grid is typically a power system, or power utility, which is a network of transmission lines, transformers, loads, power generators, motors and the like. FIG. 3B depicts an example graph of the line voltage, $V_j$, and the line current, $i_j$, versus time where $i_j$ lags $V_j$ and FIG. 3C depicts an example graph of the line voltage, $V_j$, and the line current, $i_j$, versus time where $i_j$ leads $V_j$. An example of a similar type of power converter is a static synchronous compensator (STATCOM).

FIG. 4A depicts a two level grid connected inverter (GCI) 108, which is another example of a power converter. Here, GCI 108 is used to convert time-static, or direct current (DC), power into time-varying, or alternating current (AC), power flowing into the power grid, where the generated current ($i_j$) has a polarity opposite that of the line voltage ($V_j$). The power grid is typically a power system, or power utility, which is a network of transmission lines, transformers, loads, power generators, motors and the like. FIG. 4B depicts a graph of $V_j$ and $i_j$ versus time, where $V_j$ and $i_j$ have opposite polarities. GCI 108 is typically used to convert DC energy from renewable or alternative energy sources such as fuel cells, photovoltaic sources, batteries and the like.

Each of the power converters 102-108 are operating by controlling the state (opened or closed) of each of the various switches 110. Some conventional control methods employ DQ conversion and real-time reference current calculation. These methods require a high-speed digital microprocessor and high performance A/D converters and result in a higher cost, higher complexity and lower reliability. Another conventional control method is referred to as one cycle control (OCC).

OCC is a unified pulse width modulation (PWM) control method that is capable of controlling basic power converters with relatively lower costs, lower complexity and higher reliability. OCC is described in more detail in U.S. Pat. No. 5,278,490, issued Jan. 11, 1994, which is fully incorporated by reference herein. Many previous OCC controllers were not capable of operation with different types of power converters 102-108. The design of separate OCC controllers was required for each type of power converter 102-108.

More recently, OCC controllers were developed capable of controlling more than one type of power converter. For instance, three phase two-level OCC controllers capable of controlling a PFC 102, APF 104 and GCI 108 were described in U.S. Pat. No. 6,297,980 issued on Oct. 2, 2001 and U.S. Pat. No. 6,545,887, issued on Apr. 8, 2003, both of which are fully incorporated by reference herein. However, these OCC controllers were not capable of operation with each type of power converter 102-108.

Accordingly, a universal controller capable of controlling multiple types of two and three level power converters is needed.

SUMMARY

The systems and methods described herein provide for modulation methods for controlling a three phase three level power converter with a controller. In one exemplary embodiment of a modulation method, the power converter includes a first, a second and a third voltage source where each voltage source is configured to output a time-varying signal and is inductively coupled to a separate input node. Each input node is preferably connectable to a first output node, a second output node and a third output node. The power converter also includes a first capacitive element coupled between the first and the second output node and a second capacitive element coupled between the second output node and the third output node. Each time-varying voltage signal has substantially the same period and a different phase.

The method includes determining which voltage signal has the highest voltage, the lowest voltage and the intermediate voltage higher than one of the voltage signals and lower than the other voltage signal for each of a plurality of sub-periods. Then connecting the voltage signal having the intermediate voltage to only the first output node during each sub-period, connecting the voltage signal having the highest voltage to one of the second or third output nodes during each sub-period; and connecting the voltage signal having the lowest voltage to one of the second or third output nodes during each sub-period.

In another exemplary embodiment, the modulation method includes providing a power converter having a first, a second and a third voltage source each configured to output a time-varying signal. The first and second voltage sources are each preferably inductively coupled to a separate input node. The input nodes can be connectable to a first and second output node. The third voltage source is preferably inductively coupled to a third output node. The power converter also includes a first capacitive element coupled between the first and the second output node, and a second capacitive element coupled between the second output node and the third output node. Each time-varying voltage signal preferably has substantially the same period and a different phase. The method also includes providing a controller configured to control the connection of the second and third voltage sources to the second and third output nodes.

In yet another exemplary embodiment of a modulation method, the power converter includes a first, a second and a third voltage source where each voltage source is configured to output a time-varying signal and is inductively coupled to a separate input node. Each input node is preferably connectable to a first output node, a second output node and a third output node. The converter can further include a first capacitive element coupled between the first and the second output node and a second capacitive element coupled between the second output node and the third output node. Each time-varying voltage signal preferably has substantially the same period and a different phase.

The method preferably includes determining which voltage signal has the highest voltage, the lowest voltage and the intermediate voltage higher than one of the voltage signals and lower than the other voltage signal for each of a plurality of sub-periods, determining which voltage signal is dominant for each of the plurality of sub-periods, connecting the voltage signal having the lowest voltage to only the third output node when the dominant voltage signal is lower than the non-dominant voltage signals, connecting the voltage signal having the highest voltage to one of the first output node and the second output node during each sub-period where the dominant voltage signal is lower than the non-dominant voltage signals, connecting the voltage signal having the intermediate voltage to one of the second output node and the third output node during each sub-period where the dominant voltage signal is lower than the non-dominant voltage signals, connecting the voltage signal having the highest voltage to only the second output node when the dominant voltage signal is higher than the non-dominant voltage signals, connecting the voltage signal having the lowest voltage to one of the first output node and the second output node during each sub-period where the dominant voltage signal is higher than the non-dominant voltage signals and connecting the voltage signal having the intermediate voltage to one of the second output node and the third output node during each sub-period where the dominant voltage signal is higher than the non-dominant voltage signals.

The systems and methods described herein also provide for a universal controller capable of controlling numerous types of three phase, two and three level power converters. Any type of power converter can be controlled in any of the four quadrants of the PQ domain (the domain of real and imaginary power). The universal controller can include a region selection unit, a signal selection unit, a reference signal source unit, a drive signal distribution unit and a control core. The control core can be implemented with one-cycle control, average current mode control, current mode control, sliding mode control and the like. The controller can be configured to control numerous types of power converters by adjusting the reference signal source unit. Also provided are multiple embodiments of control cores suitable for use with the various modulation methods.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

FIG. 1B is a graph of voltage versus time depicting various input and output signals for the PFC rectifier depicted in FIG. 1A.

FIG. 13D is a table depicting duty ratio and voltage values for the exemplary modulation method depicted in FIG. 13B.

FIG. 13G is a table depicting duty ratio and voltage values for the exemplary modulation method depicted in FIG. 13F.

FIG. 15D is a table depicting duty ratio and voltage values for the exemplary modulation method depicted in FIG. 15B.

DETAILED DESCRIPTION

Figure 5:
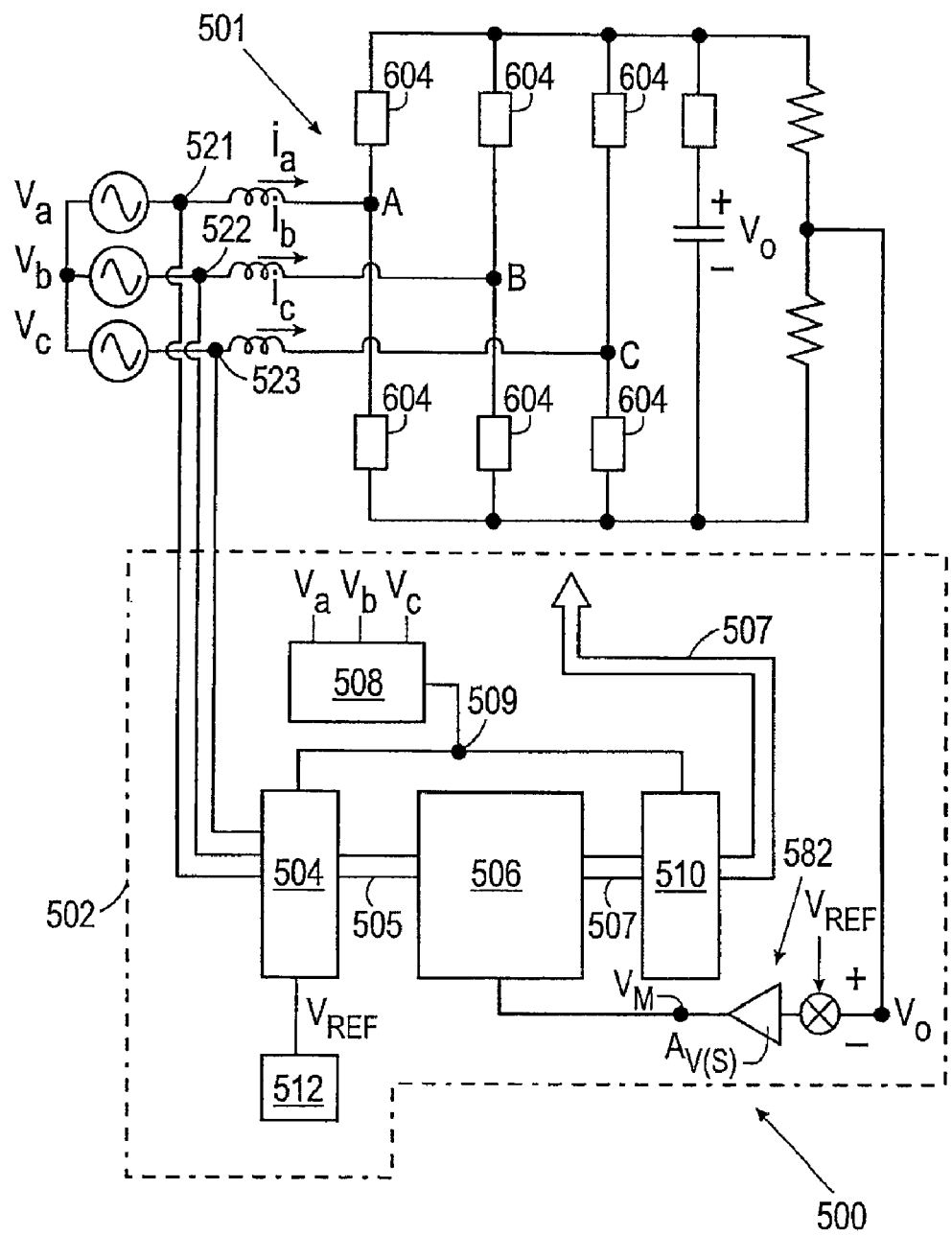
FIG. 5 is a schematic view depicting one exemplary embodiment of a power converter system.

The systems and methods described herein are directed towards a universal controller capable of controlling multiple types of three phase power converters, as well as methods for modulating a universal controller. FIG. 5 depicts an exemplary embodiment of a power converter system 500 having universal controller 502 capable of controlling a two or three level power converter 501 (a two-level power converter 501 is depicted here) in both high and low voltage applications. Power converter 501 can be any type of power converter, including, but not limited to a PFC, APF, SVC and GCI. The controller 502 can operate in any PQ quadrant, allowing multiple advantages such as bidirectional current flow in both PFC rectifier and GCI power converters 501. In this embodiment, universal controller 502 includes a signal selection unit 504, a control core 506, a region selection unit 508, a drive signal distribution unit 510 and a reference signal source unit 512.

Here, region selection unit 508 is configured to determine the current operating region for the power converter based on the time-varying voltage signals $V_a$, $V_b$ and $V_c$. Operating regions will be discussed in more detail below with respect to FIGS. 13A and 15A. Region selection unit 508 then outputs one or more signals 509 representative of this determination to signal selection unit 504 and drive signal distribution unit 510. Reference signal source unit 512 is configured to provide one or more reference signals, $V_{ref}$, to the input selection unit 504, which then combines the reference signal with the three time varying signals $V_a$, $V_b$ and $V_c$ and preferably selects the appropriate combined one or more current signals, $R_s i_a$, $R_s i_b$ or $R_s i_c$, based on the current operating region. The signal selection unit 504 then outputs the selected input signals 505 to the control core 506.

Control core 506 is preferably configured to generate drive signals 507 for driving the switches 604 (or switch 605, which is not shown here but described below) in power converter 501. Control core 506 is preferably configured to generate the drive signals 507 based on the reference signal(s) $V_{ref}$, the current signals, $R_s i_a$, $R_s i_b$ or $R_s i_c$, the region of operation and the output voltage, $V_m$, from voltage loop compensator 582. Control core 506 outputs the drive signals 507 to drive signal distribution unit 510, which then preferably routes the drive signals 507 to the appropriate switch 604 based on the operating region.

Figure 6:
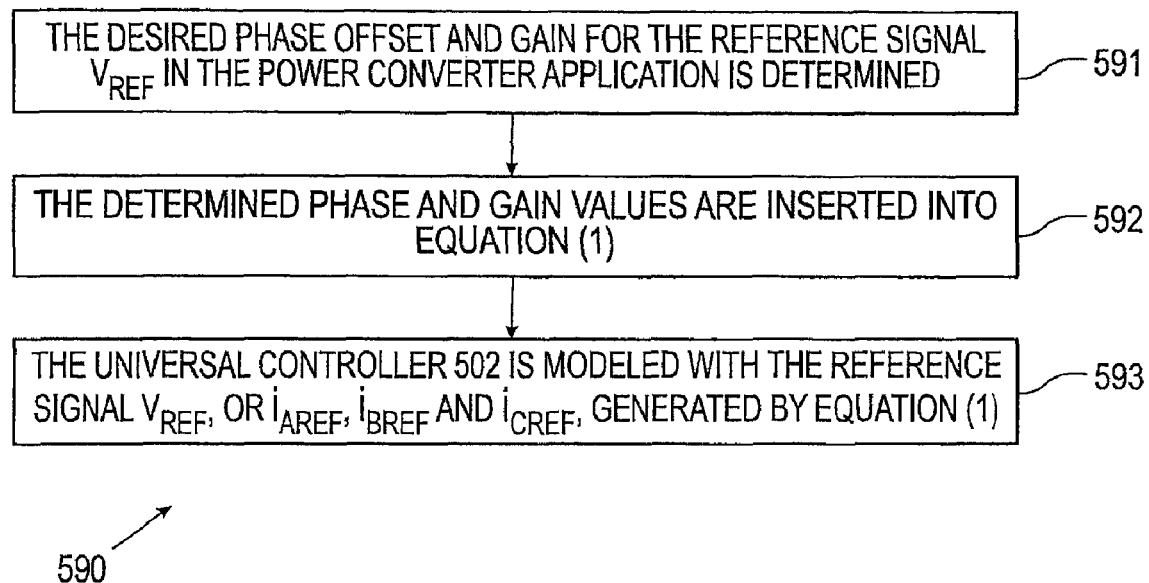
FIG. 6 is a flow diagram depicting a method of modeling a power converter controller.

The reference signal source unit 512 is preferably configured according to the type of power converter 501 being controlled. Preferably, the reference signal $V_{ref}$ is generated according to the following equation (1):

$$\begin{bmatrix} i_{aref} \\ i_{bref} \\ i_{cref} \end{bmatrix} = -G_e \cdot e^{j \cdot \theta} \begin{bmatrix} v_a \\ v_b \\ v_c \end{bmatrix} \quad (1)$$

where $i_{aref}$, $i_{bref}$ and $i_{cref}$ are the reference signal currents, $G_e$ is a constant and $\theta$ is the desired phase offset. A method of designing a universal controller 502 for use in a power converter 501 is provided by the systems and methods described herein. FIG. 6 depicts an exemplary design method 590 for modeling a universal controller 502. At 591, the desired phase offset and gain for the reference signal $V_{ref}$ in the power converter application is determined. At 592, these phase and gain values are inserted into equation (1). At 593, the universal controller 502 is modeled with the reference signal $V_{ref}$ or $i_{aref}$, $i_{bref}$ and $i_{cref}$ generated by equation (1).

Figure 7A:
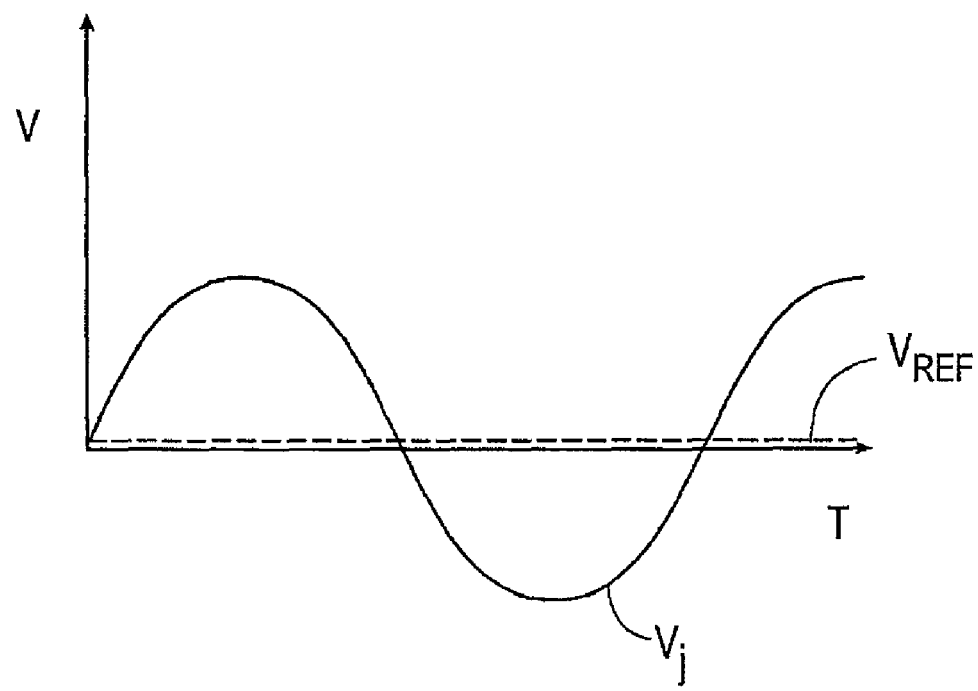
FIG. 7A is a graph of voltage versus time depicting an exemplary reference signal and input signal for a PFC rectifier or APF converter.
Figure 7B:
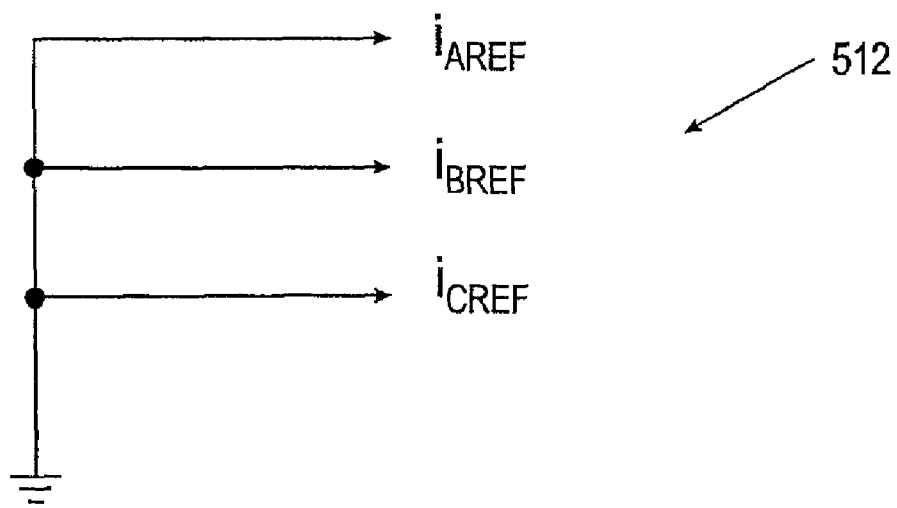
FIG. 7B is a schematic view depicting one exemplary embodiment of a reference signal source unit for a PFC rectifier or APF converter.

Some exemplary reference signals $V_{ref}$ and the configurations of reference signal source unit 512 used to generate the reference signals $V_{ref}$ are depicted in FIGS. 7-9. FIG. 7A depicts one exemplary reference signal $V_{ref}$ for use when power converter 501 is a PFC rectifier or APF. Here, the reference signal $V_{ref}$ is a constant voltage, preferably ground, which is independent of the input signal, $V_a$, $V_b$ or $V_c$, denoted here by $V_j$. FIG. 7B depicts one exemplary embodiment of a configuration that can be used to generate the reference signals $i_{aref}$, $i_{bref}$ and $i_{cref}$ for each of the main lines A, B and C.

Figure 8A:
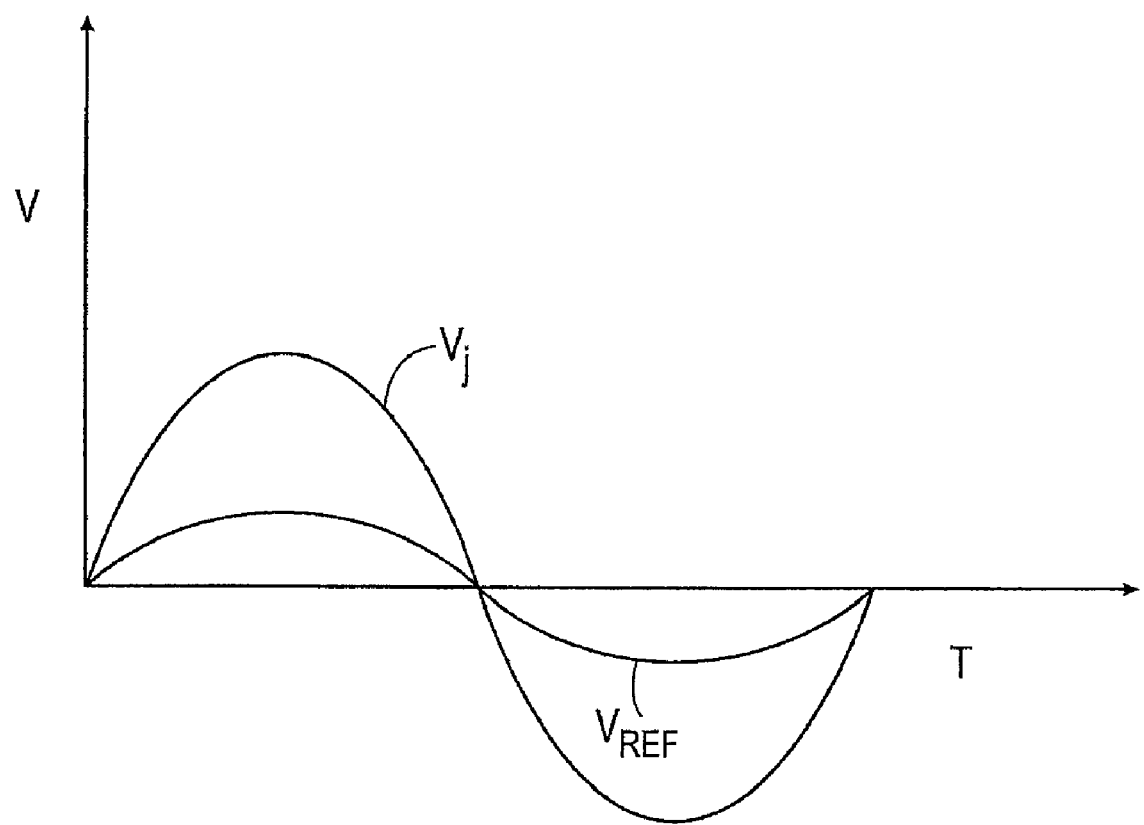
FIG. 8A is a graph of voltage versus time depicting an exemplary reference signal and input signal for a GCI converter.
Figure 8B:
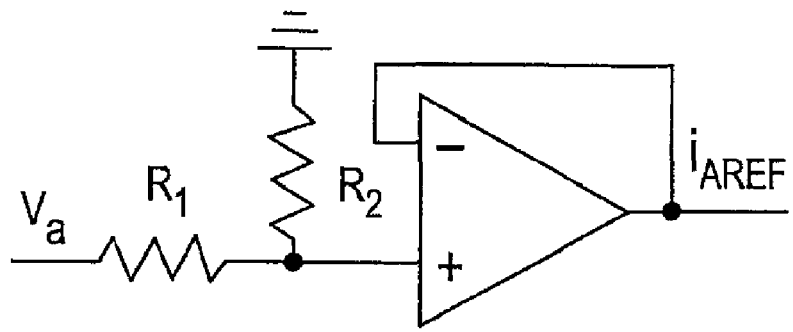
FIG. 8B is a schematic view depicting one exemplary embodiment of a reference signal source unit for a GCI converter.
Figure 8B:
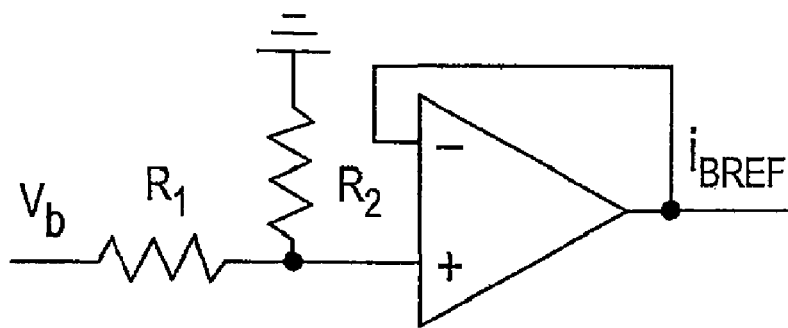
Figure 8B:
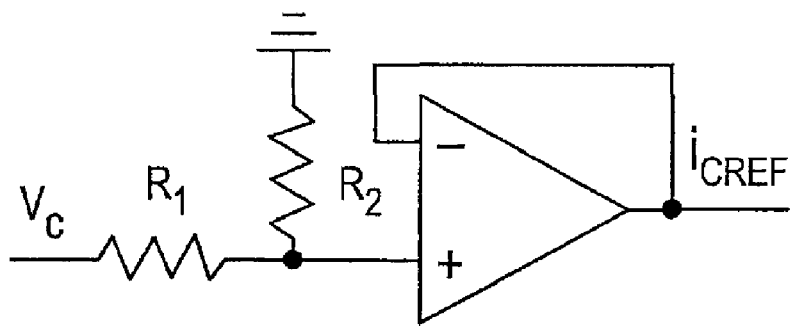

FIG. 8A depicts an exemplary reference signal $V_{ref}$ for use when power converter 501 is a GCI. Here, $V_{ref}$ is proportional to the input signal, $V_j$. FIG. 8B depicts an exemplary embodiment of reference signal source unit 512 configured to generate the $V_{ref}$ signal depicted in FIG. 8A. In this embodiment, the input voltages $V_a$, $V_b$ and $V_c$ are input to the positive input of an operational amplifier having a feedback to the negative input in order to generate the reference signals $i_{aref}$, $i_{bref}$ and $i_{cref}$.

Figure 9A:
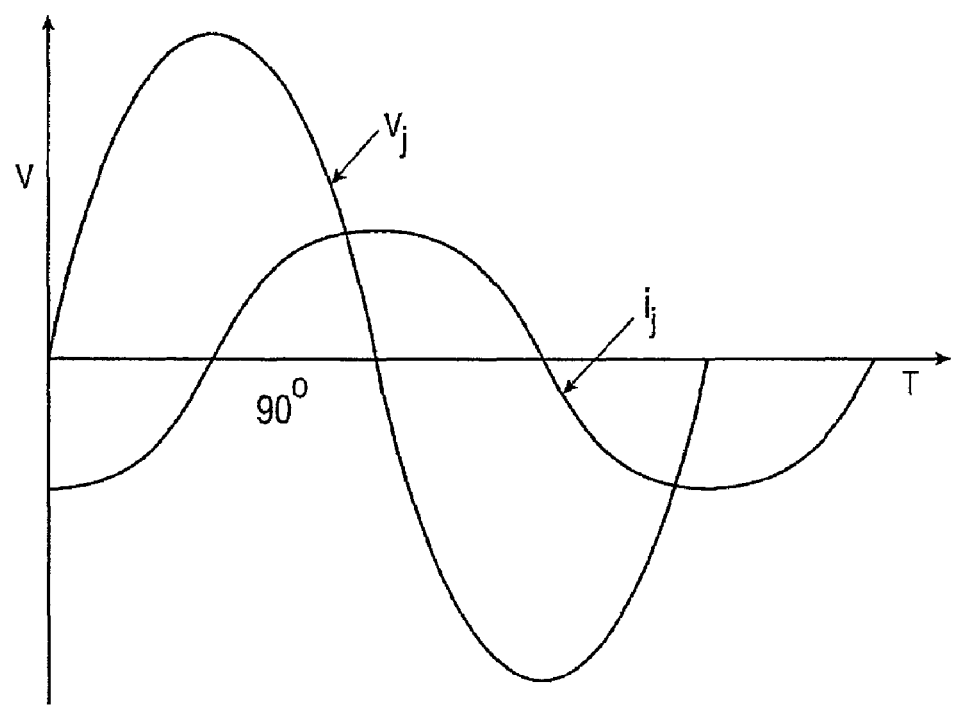
FIG. 9A is a graph of voltage versus time depicting an exemplary reference signal and input signal for an SVC converter.
Figure 9B:
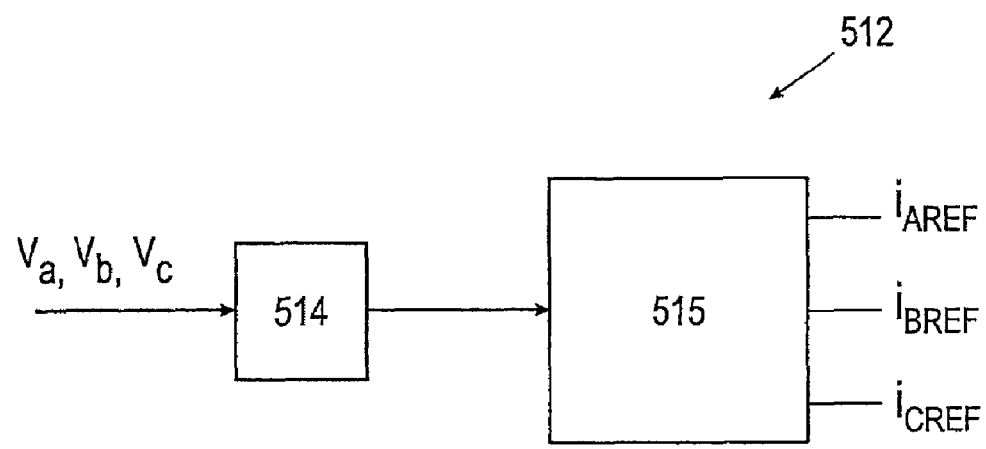
FIG. 9B is a schematic view depicting one exemplary embodiment of a reference signal source unit for an SVC converter.

FIG. 9A depicts an exemplary reference signal $V_{ref}$ for use when power converter 501 is an SVC. Here, $V_{ref}$ is proportional to and 90 degrees out of phase with the input signal, $V_j$. FIG. 9B depicts an exemplary embodiment of reference signal source unit 512 configured to generate the $V_{ref}$ signal depicted in FIG. 9A. In this embodiment, the input voltages $V_a$, $V_b$ and $V_c$ are input to a PLL 514, which preferably determines the frequency of the input signal and uses a look up table in memory 515 to determine the amount of time by which the input signal should be delayed to generate the proper phase delay in the reference signals $V_{aref}$, $V_{bref}$ and $V_{cref}$. PLL 514 preferably has a gain of $+/-j V_m G_e$. It should be noted that the embodiments depicted in FIGS. 7-9 are exemplary embodiments only and are not intended to limit the systems and methods described herein. Any reference signal source unit 512 can be used in accordance with the needs of the application.

Figure 10:
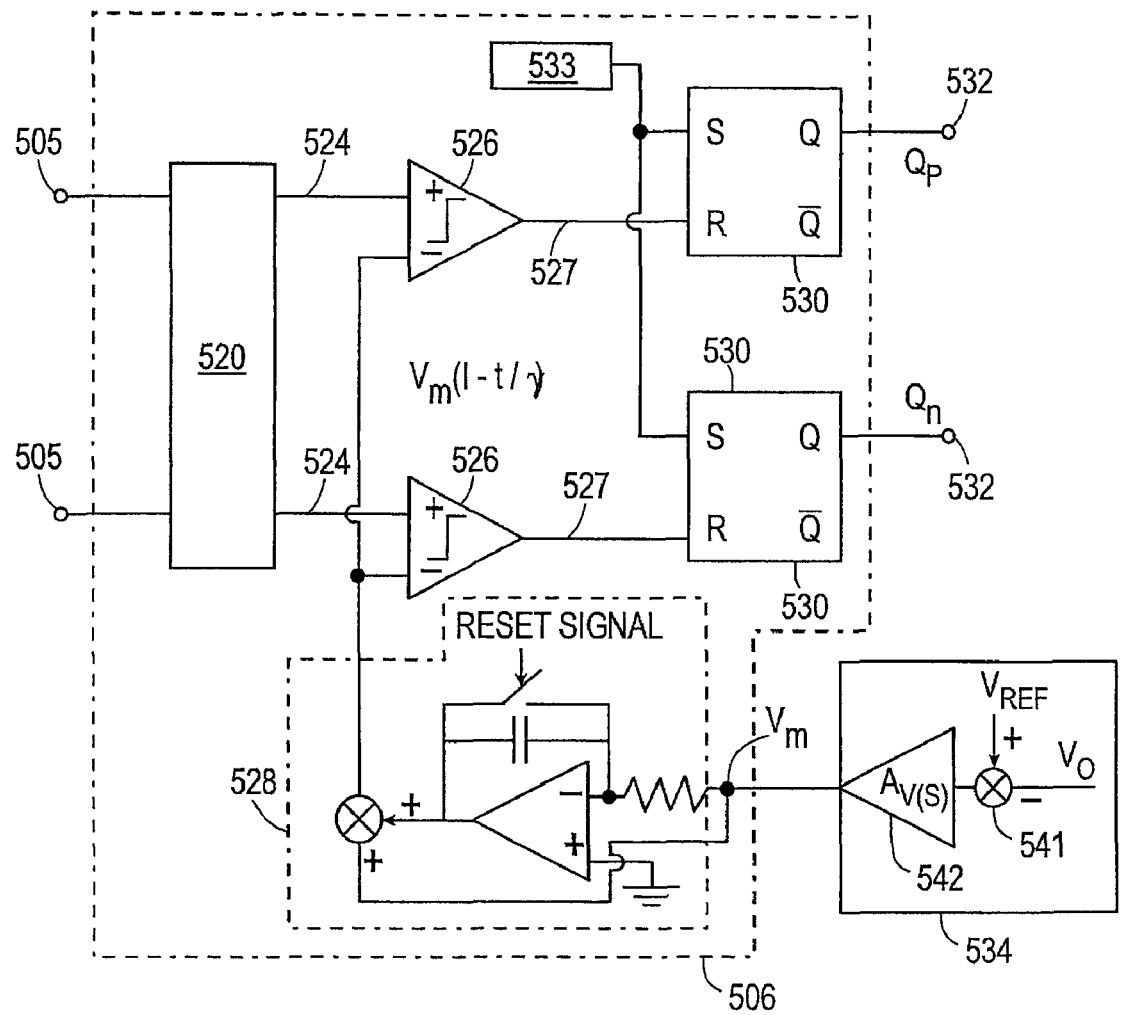
FIG. 10 is a schematic view depicting one exemplary embodiment of an OCC control core.

Numerous control methods can be used to implement control core 506. Preferably, control core 506 is implemented as an OCC core 506. FIG. 10 depicts one exemplary embodiment of control core 506 implemented as a vector operated OCC core 506 similar to that described in U.S. Pat. No. 6,545,887. The vector controlled OCC core 506 can operate at a rate equivalent to a ⅔ switching frequency. Because the controller 502 is an OCC controller, it is capable of fast dynamic response because the inner current control loop is embedded in the pulse-width modulator so as to provide dynamic response with one switching cycle. Consequently, the operation of the controller 502 at wider line frequency ranges, such as 0-2 kilohertz, is achievable with low total harmonic distortion (THD) in the line currents.

Figure 11A:
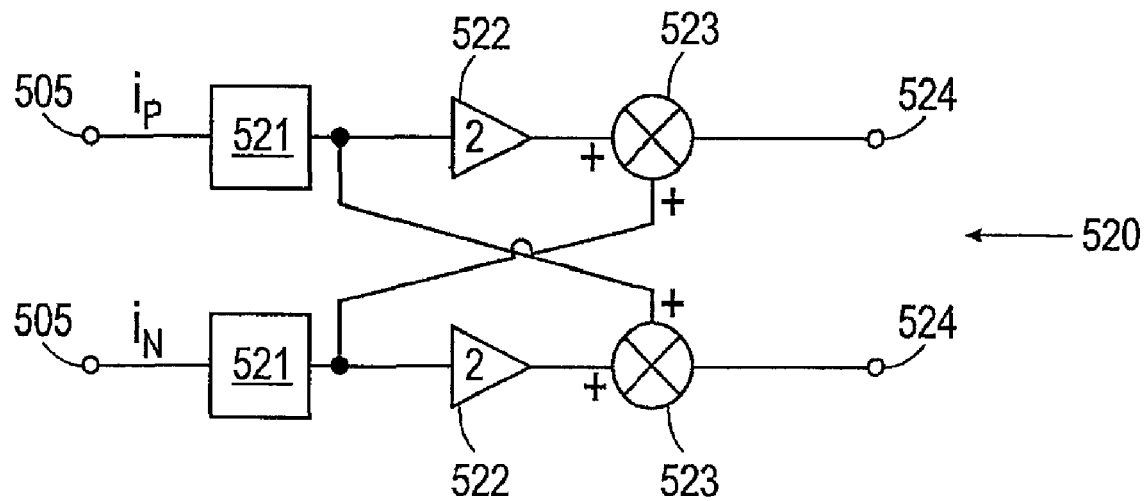
FIGS. 11A-B are a schematic views depicting exemplary embodiments of signal adjustment units.
Figure 11B:
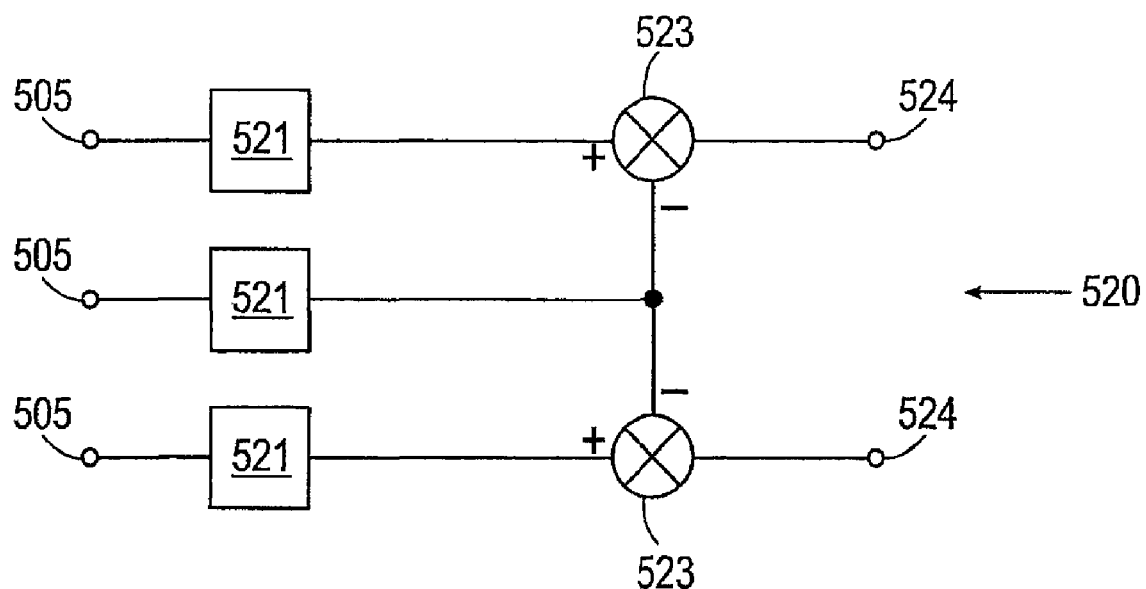

In this embodiment, controller 502 can be implemented with relatively few linear and logic components. The input signals 505 from the signal selection unit 504 are input to a signal adjustment unit 520. FIGS. 11A-B depict two exemplary embodiments of signal adjustment unit 520. FIG. 11A depicts an exemplary embodiment where adjustment unit 520 has two input signals 505, shown as $i_p$ and $i_n$. The input signals are input to a low pass filter 521 and then to a cross coupled concatenation of amplifiers 522 and adders 523, which output the summed signals 524. In this embodiment, each amplifier 522 has a gain of two.

FIG. 11B depicts an exemplary embodiment of the signal adjustment unit 520 having three input signals 505, shown here as $i_p$, $i_t$ and $i_n$. Each of the input signals 505 are input to a low pass filter 521 and then the it signal is then subtracted from each of the $i_p$ and $i_n$ signals in the adders 524, which then output the resulting signals 524. One of skill in the art will readily recognize that any signal adjustment unit 520 can be used in control core 506 and, accordingly, the systems and methods described herein are not limited to the embodiments depicted in FIGS. 11A-B.

Referring back to FIG. 10, the signals 524 are each input to a comparator 526 configured to compare the signals 524 with signals 525 output from integrator unit 528, which is configured to integrate the output signal 535 from voltage loop compensator 534. Integrator 528 is also preferably provided with a reset. One of skill in the art will readily recognize that any type of integrator or an equivalent can be used for integrator 528. Comparators 526 output the resulting compared signal 527 to flip-flops 530. In this embodiment, flip-flops 530 are S/R flip-flops.

Figure 12:
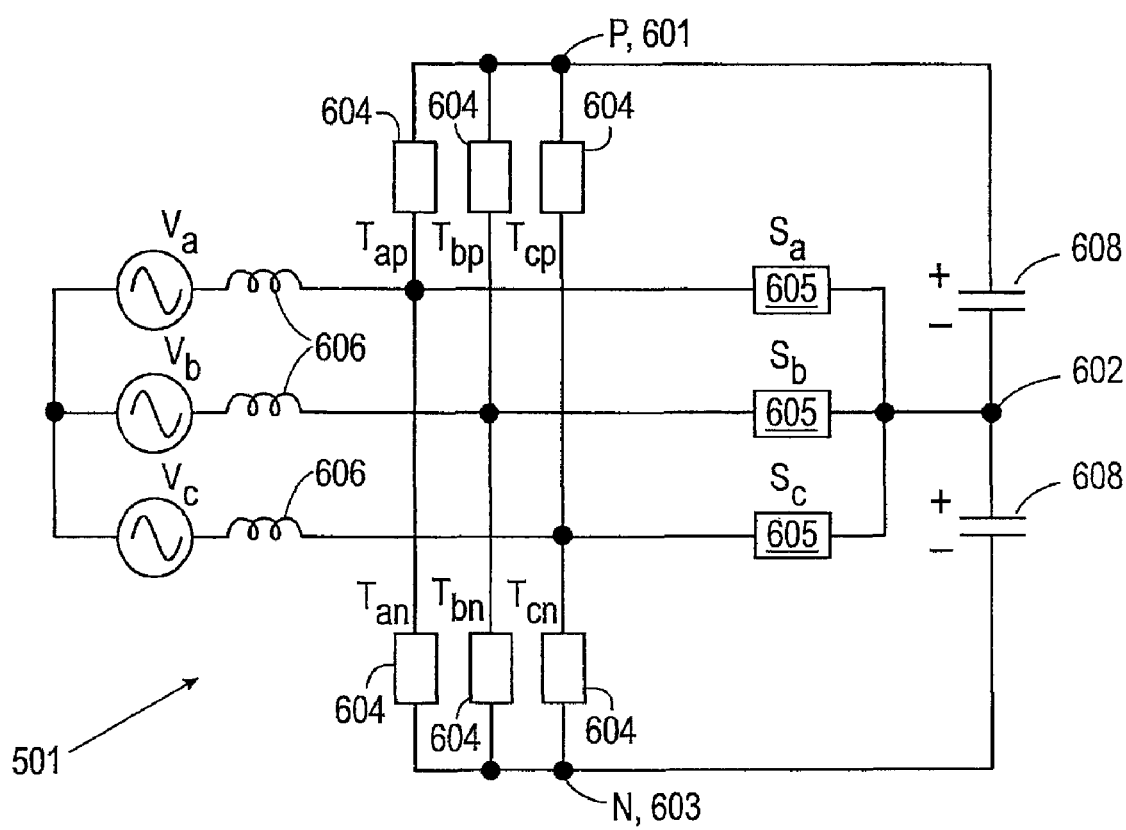
FIG. 12 is a schematic view depicting an exemplary embodiment of a three phase three level power converter.

The systems and methods described herein also provide for modulation methods for controlling power converter 501. Each of these modulation methods are dependent upon the region of operation of power converter 501, for instance, as determined by region selection unit 508. FIG. 12 depicts a generic three phase three level converter 501 for use with several of the modulation methods described herein.

In this embodiment, each of the three main line time varying voltages $V_a$, $V_b$ and $V_c$ are applied to an inductive element 606 and then routed through an array of switches 604 and 605. Here, each voltage signal $V_a$, $V_b$ and $V_c$ is connected to three nodes 601-603 via a switch 604-605. The three nodes are separated by capacitive elements 608. Specifically, the voltage signals $V_a$, $V_b$ and $V_c$ are connected to node 601 (also shown as the P node) by switches 604 labeled $T_{ap}$, $T_{bp}$ and $T_{cp}$, respectively. Likewise, the voltage signals $V_a$, $V_b$ and $V_c$ are connected to node 603 (also shown as the N node) by switches 604 labeled $T_{an}$, $T_{bn}$ and $T_{cn}$, respectively. The voltage signals $V_a$, $V_b$ and $V_c$ are also connected to node 602 by switches 605 labeled $S_a$, $S_b$ and $S_c$, respectively.

Each switch 604 and 605 is preferably controlled by a drive signal 507 generated by the universal controller 502. In this embodiment, switches 604 are each preferably a power transistor, such as a power MOSFET (metal-oxide semiconductor field effect transistor), IGBT (insulated gate bipolar transistor) and the like, while switches 605 are preferably four quadrant switches and the like. One of skill in the art will readily recognize that any type of switch can be used in accordance with the needs of the application.

Figure 13A:
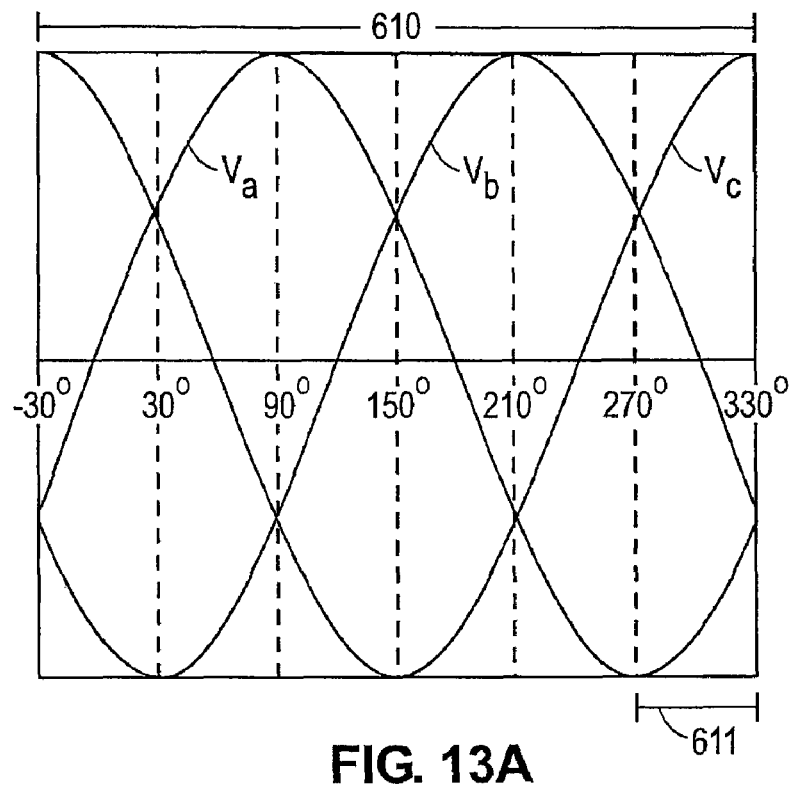
FIG. 13A is a graph of voltage versus time depicting exemplary operating regions for one period of the main line time-varying voltage signals.

FIG. 13A depicts an exemplary graph of voltage versus time for one period 610 of voltage signals $V_a$, $V_b$ and $V_c$, each of which preferably have a 120 degree phase separation. Here, period 610 is divided into six regions of operation, or sub-periods 611, for use in a vector controlled methodology. In this embodiment, each voltage signal $V_a$, $V_b$ and $V_c$ has a common relation with each other of the region 611. For instance, in the first region 611 occurring from −30 to 30, $V_c$ has a higher voltage than $V_a$, which in turn is higher than $V_b$. In the region 611 occurring from 30 to 90, $V_a$ is higher than $V_c$, which in turn is higher than $V_b$. Throughout this description, the signal having the highest voltage over a particular region 611 will be referred to as the high-signal, the signal having the lowest voltage will be referred to as the low-signal and the signal having the intermediate voltage, i.e., a voltage higher than the low-signal but lower than the high-signal, will be referred to as the mid-signal.

Figure 13C:
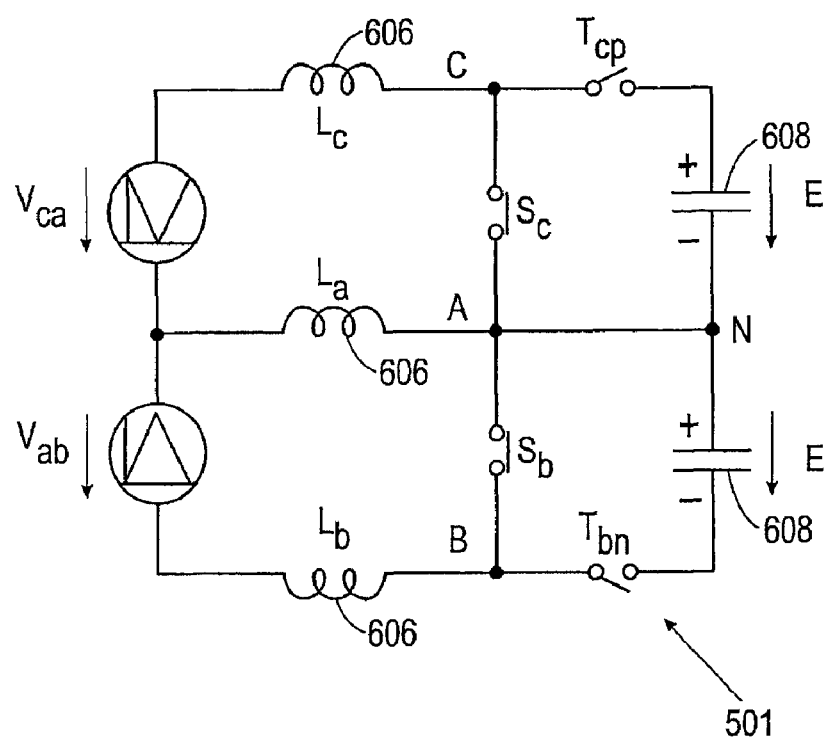
FIG. 13C is a schematic view depicting an exemplary embodiment of an equivalent three phase three level power converter for the modulation method depicted in FIG. 13B.
Figure 13B:
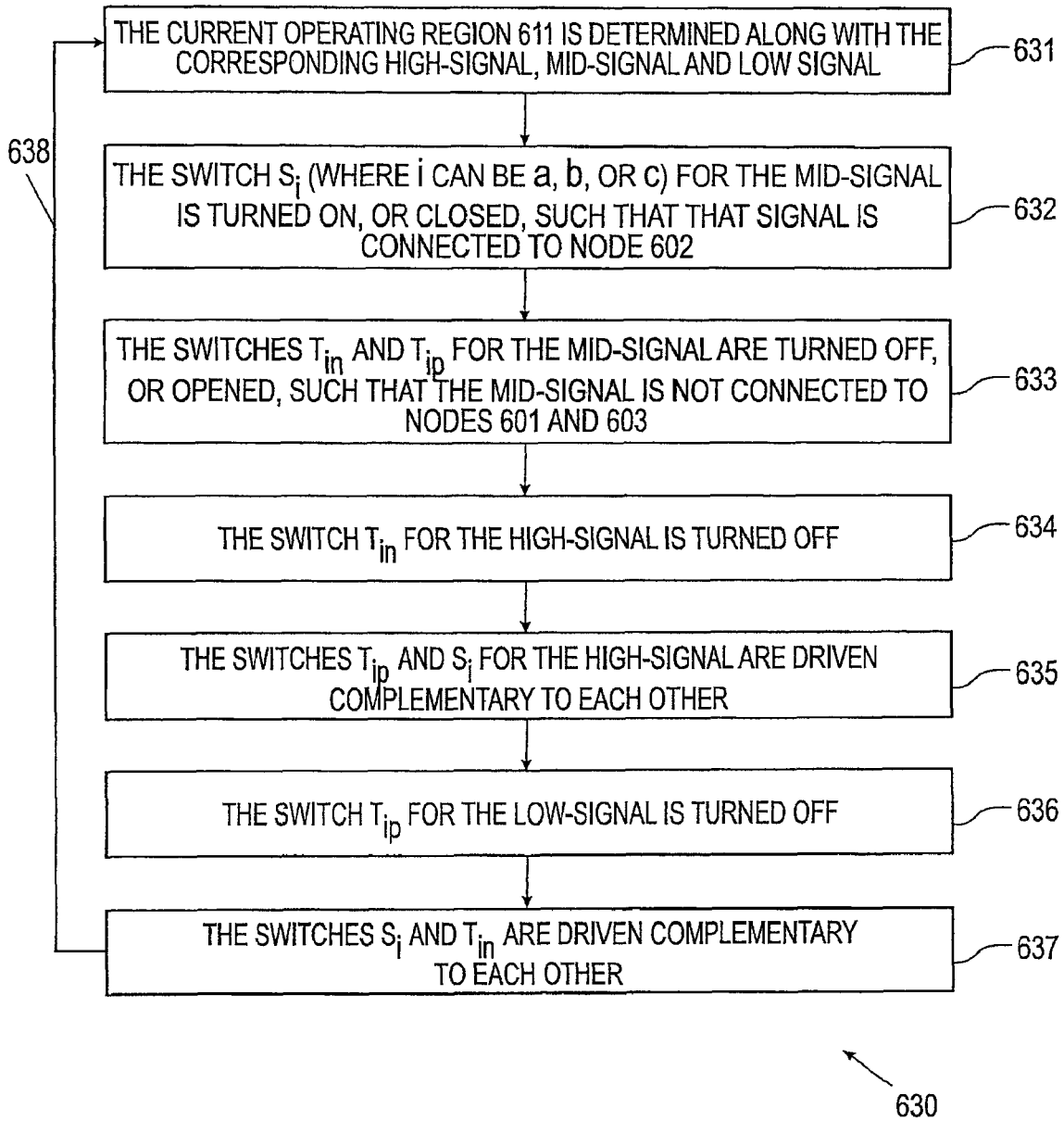
FIG. 13B is a flow diagram depicting an exemplary modulation method for controlling a power converter.

FIG. 13B is a flow chart depicting a modulation method 630 for use with the operating regions 611 depicted in FIG. 13A. In modulation method 630, the switches 604 and 605 in power converter 501 are driven open or closed based on the current operating region 611. At 631, the current operating region 611 is determined along with the corresponding high-signal, mid-signal and low-signal. At 632, the switch $S_i$ (where i can be a, b or c) for the mid-signal is turned on, or closed, such that that signal is connected to node 602. At 633, the switches $T_{in}$ and $T_{ip}$ for the mid-signal are turned off, or opened, such that the mid-signal is not connected to nodes 601 and 603. At 634, the switch $T_{in}$ for the high-signal is turned off. Then, at 635, the switches $T_{ip}$ and $S_i$ for the high-signal are driven complementary to each other, the duty ratio of $S_i$ being defined by $d_p$. At 636, the switch $T_{ip}$ for the low-signal is turned off, while at 637, the switches $S_i$ and $T_{in}$ are driven complementary to each other, the duty ratio of $S_i$ being defined by $d_n$. At 638, the method reverts to 631 and repeats the method for the next operating region 611. It should be noted that steps 632-638 do not have to be performed in the order they are listed and can be performed in any order, including simultaneously.

Modulation method 630 is a vector-controlled method that can allow the power converter 501 depicted in FIG. 12 to be decoupled into a different dual-boost converter for every operating region 611. FIG. 13C depicts an exemplary embodiment of power converter 501 resulting from the application of modulation method 630 during operating region 611 occurring from −30 to 30 degrees. Here, power converter 501 is depicted as an equivalent dual-boost converter having two sawtooth voltage sources $V_{ca}$ and $V_{ab}$, coupled with inductive elements 606 for the respective main lines A, B and C. The inductive element 606 for the C line is coupled with the switches $S_c$ and $T_{cp}$. The switch $T_{cp}$ is in turn coupled with a capacitive element 608. Likewise, the inductive element 606 for the B line is coupled with the switches $T_{bn}$ and $S_b$. The switch $T_{bn}$ is in turn coupled with another capacitive element 608, which is coupled with the other capacitive element 608 and the output of the inductive element 606 for the A line. The switches $S_b$ and $S_c$ are coupled together and also with the output of the inductive element 606 for the A line. One of skill in the art will readily recognize that the application of modulation method 630 to power converter 501 will result in a different equivalent circuit for each operating region 611.

The DC gain equation for modulation method 630 is given in equation (2) below:

$$\begin{bmatrix} 1-d_p \\ 1-d_n \end{bmatrix} = \frac{1}{E}\begin{bmatrix} 2 & -1 \\ -1 & 2 \end{bmatrix}\begin{bmatrix} v_p \\ v_n \end{bmatrix} \quad (2)$$

where $d_p$ and $d_n$ are duty ratios, E is the voltage between nodes and $v_p$ and $v_n$ are the voltages at nodes 601 and 603, respectively. FIG. 13D depicts a table 639 showing the duty ratios $d_p$ and $d_n$ and the voltages $v_p$ and $v_n$ for each operating region 611 of modulation method 630.

Figure 13E:
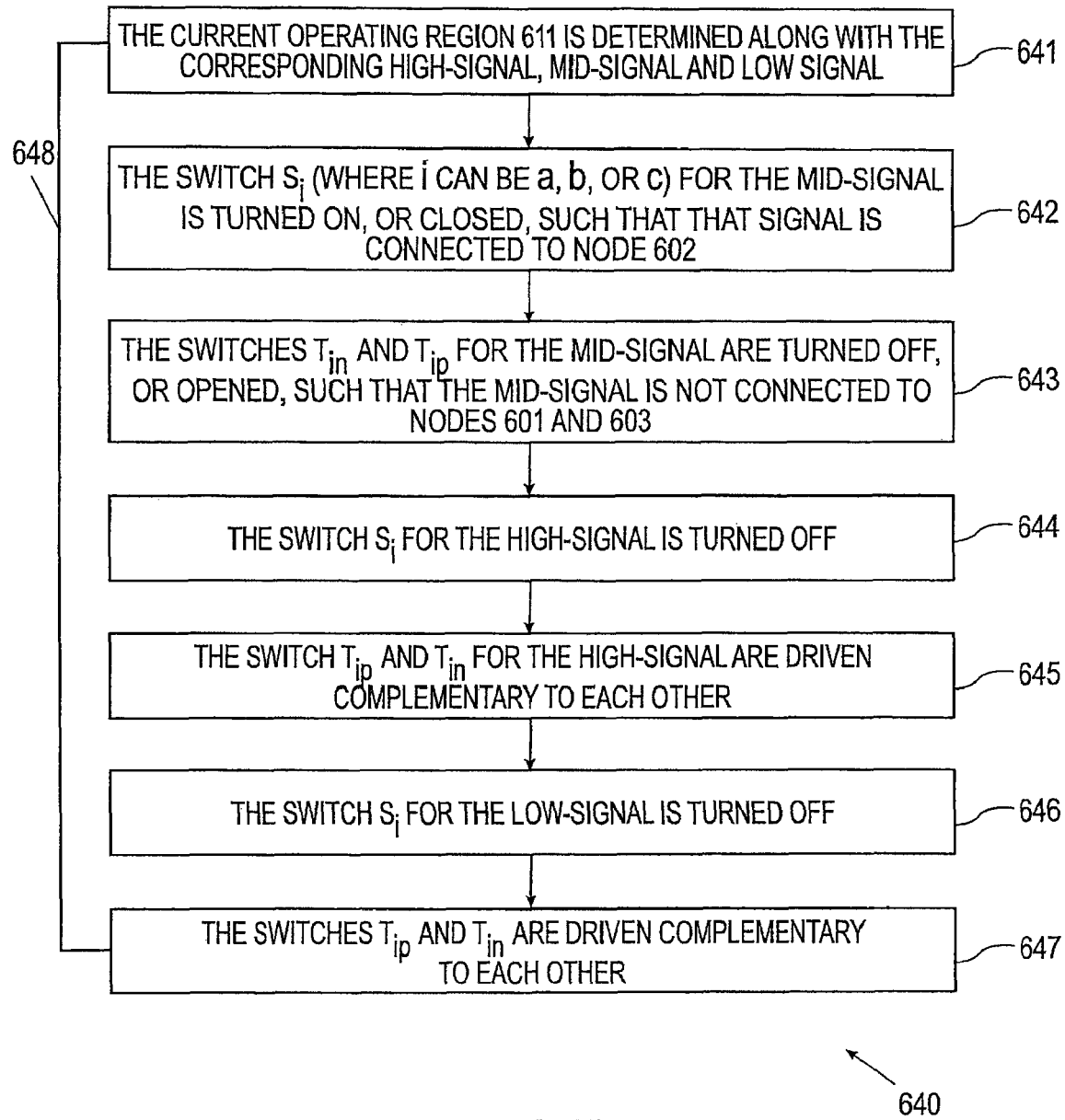
FIG. 13E is a flow diagram depicting another exemplary modulation method for controlling a power converter.

FIG. 13E is a flow chart depicting another exemplary modulation method 640 for use with the operating regions 611 depicted in FIG. 13A. In modulation method 640, the switches 604 and 605 in power converter 501 are driven open or closed based on the current operating region 611. At 641, the current operating region 611 is determined along with the corresponding high-signal, mid-signal and low-signal. At 642, the switch $S_i$ (where i can be a, b or c) for the mid-signal is turned on, or closed, such that that signal is connected to node 602. At 643, the switches $T_{in}$ and $T_{ip}$ for the mid-signal are turned off, or opened, such that the mid-signal is not connected to nodes 601 and 603. At 644, the switch $S_i$ for the high-signal is turned off. Then, at 645, the switches $T_{ip}$ and $T_{in}$ for the high-signal are driven complementary to each other, the duty ratio of $T_{in}$ being defined by $d_p$. At 646, the switch $S_i$ for the low-signal is turned off; while at 647, the switches $T_{ip}$ and $T_{in}$ are driven complementary to each other, the duty ratio of $T_{ip}$ being defined by $d_n$. At 648, the method reverts to 641 and repeats the method for the next operating region 611. It should be noted that steps 642-648 do not have to be performed in the order they are listed and can be performed in any order, including simultaneously.

Figure 13F:
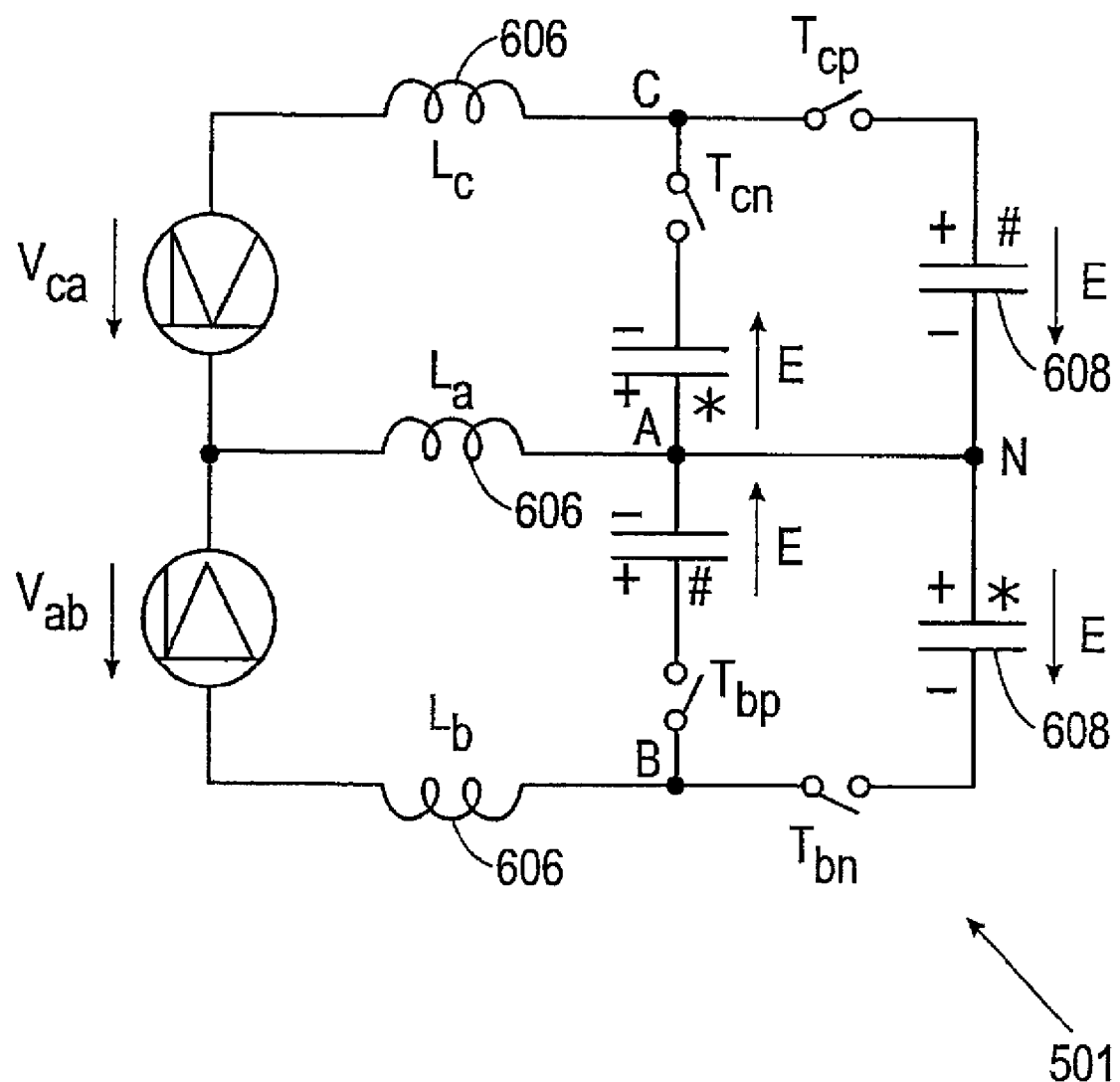
FIG. 13F is a schematic view depicting an exemplary embodiment of an equivalent three phase three level power converter for the modulation method depicted in FIG. 13E.

Modulation method 640 is also a vector-controlled method that can allow the power converter 501 depicted in FIG. 12 to be decoupled into a different dual-boost converter for every operating region 611. FIG. 13F depicts an exemplary embodiment of power converter 501 resulting from the application of modulation method 640 during operating region 611 occurring from −30 to 30 degrees. Here, power converter 501 is depicted as an equivalent dual-boost converter having two sawtooth voltage sources $V_{ca}$ and $V_{ab}$, coupled with inductive elements 606 for the respective main lines A, B and C. The inductive element 606 for the C line is coupled with the switches $T_{cn}$ and $T_{cp}$, which are in turn coupled with capacitive elements 608. Likewise, the inductive element 606 for the B line is coupled with the switches $T_{bn}$ and $T_{bp}$, which are in turn coupled with capacitive elements 608. The inductive element 606 for the A line is also coupled with the capacitive elements 608. One of skill in the art will readily recognize that the application of modulation method 630 to power converter 501 will result in a different equivalent circuit for each operating region 611.

The DC gain equation for modulation method 640 is given in equation (3) below:

$$\begin{bmatrix} 1-2d_p \\ 1-2d_n \end{bmatrix} = \frac{1}{E}\begin{bmatrix} 2 & -1 \\ -1 & 2 \end{bmatrix}\begin{bmatrix} v_p \\ v_n \end{bmatrix} \quad (3)$$

where $d_p$ and $d_n$ are duty ratios, E is the voltage between the P and N nodes and $v_p$ and $v_n$ are the voltages at the P node and N node, respectively. FIG. 13G depicts a table 649 showing the duty ratios $d_p$ and $d_n$ and the voltages $v_p$ and $v_n$ for each operating region 611 of modulation method 640.

Figure 14:
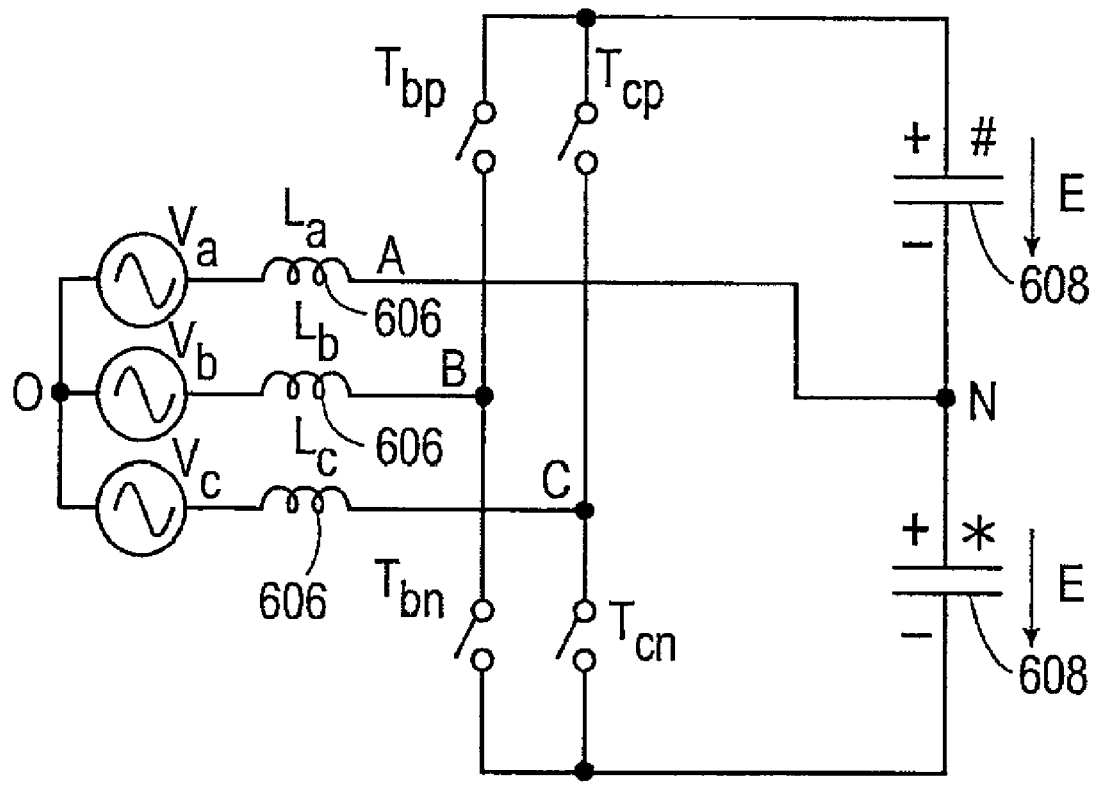
FIG. 14 is a schematic view depicting another exemplary embodiment of a three phase three level power converter.

FIG. 14 depicts an exemplary embodiment of a power converter 501 for use with another exemplary modulation method 650. This embodiment is similar to the embodiment depicted in FIG. 12, except in this embodiment the switches $S_b$, $S_c$, $T_{ap}$ and $T_{an}$ have been removed and the switch $S_a$ has been replaced by a short wire. Thus, only switches $T_{bn}$, $T_{bp}$, $T_{cn}$ and $T_{cp}$ are used to realize the three-phase conversion. This embodiment of power converter 501 can also be represented by the equivalent circuit depicted in FIG. 13C. In this embodiment, no vector controlled operation is required and the period 610 of voltage signals $V_a$, $V_b$ and $V_c$ does not require separation into different operating regions 611. This embodiment of power converter 501 can experience a higher dc-rail voltage and asymmetric line current.

The DC gain equation for modulation method 650 is given in equation (4) below:

$$\begin{bmatrix} 1-2d_p \\ 1-2d_n \end{bmatrix} = \frac{1}{E}\begin{bmatrix} 2 & -1 \\ -1 & 2 \end{bmatrix}\begin{bmatrix} v_c \\ -v_b \end{bmatrix} \quad (4)$$

where $d_p$ and $d_n$ are duty ratios and E is the voltage between the P and N nodes. The duty ratio of $T_{cn}$ and $T_{bp}$ is $d_p$ and $d_n$, respectively.

Figure 15A:
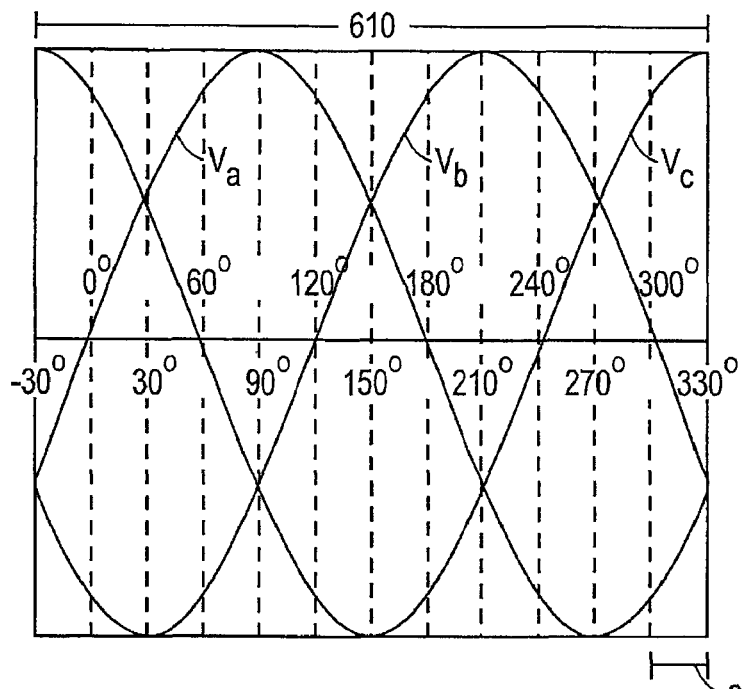
FIG. 15A is a graph of voltage versus time depicting exemplary operating regions for one period of the main line time-varying voltage signals.

FIG. 15A depicts another exemplary graph of voltage versus time for one period 610 of voltage signals $V_a$, $V_b$ and $V_c$, each of which preferably have a 120 degree phase separation. Here, period 610 is divided into twelve regions of operation, or sub-periods 611, for use in a vector controlled modulation method 650, described in more detail below. Again, in this embodiment, each voltage signal $V_a$, $V_b$ and $V_c$ has a common relation with each other of the region 611. For instance, in the first region 611 occurring from −30 to 0, $V_c$ is the high-signal, $V_a$ is the mid-signal and $V_b$ is the low-signal. Also, in this region 611 $V_c$ has a positive polarity while $V_b$ and $V_a$ have negative polarities. For each region 611, one signal preferably has a polarity opposite that of the other two signals and is referred to as the dominant signal. The two signals having the same, opposite polarity are referred to as non-dominant signals. The mid-signal can always be considered a non-dominant signal. In this embodiment, the dominant signal is negative in regions 0-30, 30-60, 120-150, 150-180, 240-270 and 270-300, while the dominant signal is positive in regions −30-0, 60-90, 90-120, 180-210, 210-240 and 300-330.

Figure 15C:
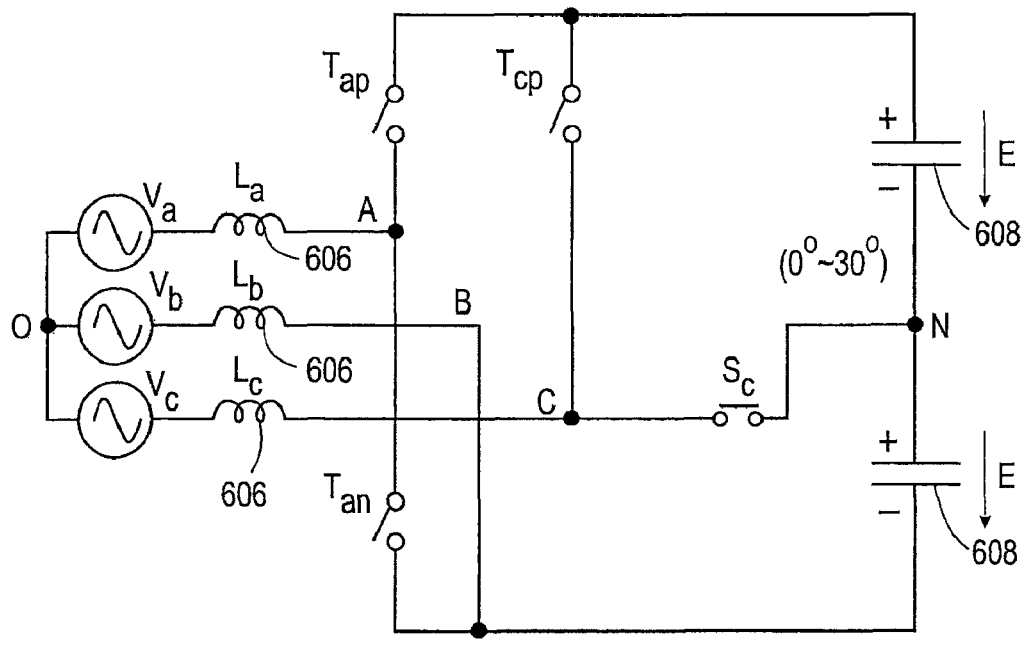
FIG. 15C is a schematic view depicting an exemplary embodiment of an equivalent three phase three level power converter for the modulation method depicted in FIG. 15B.
Figure 15B:
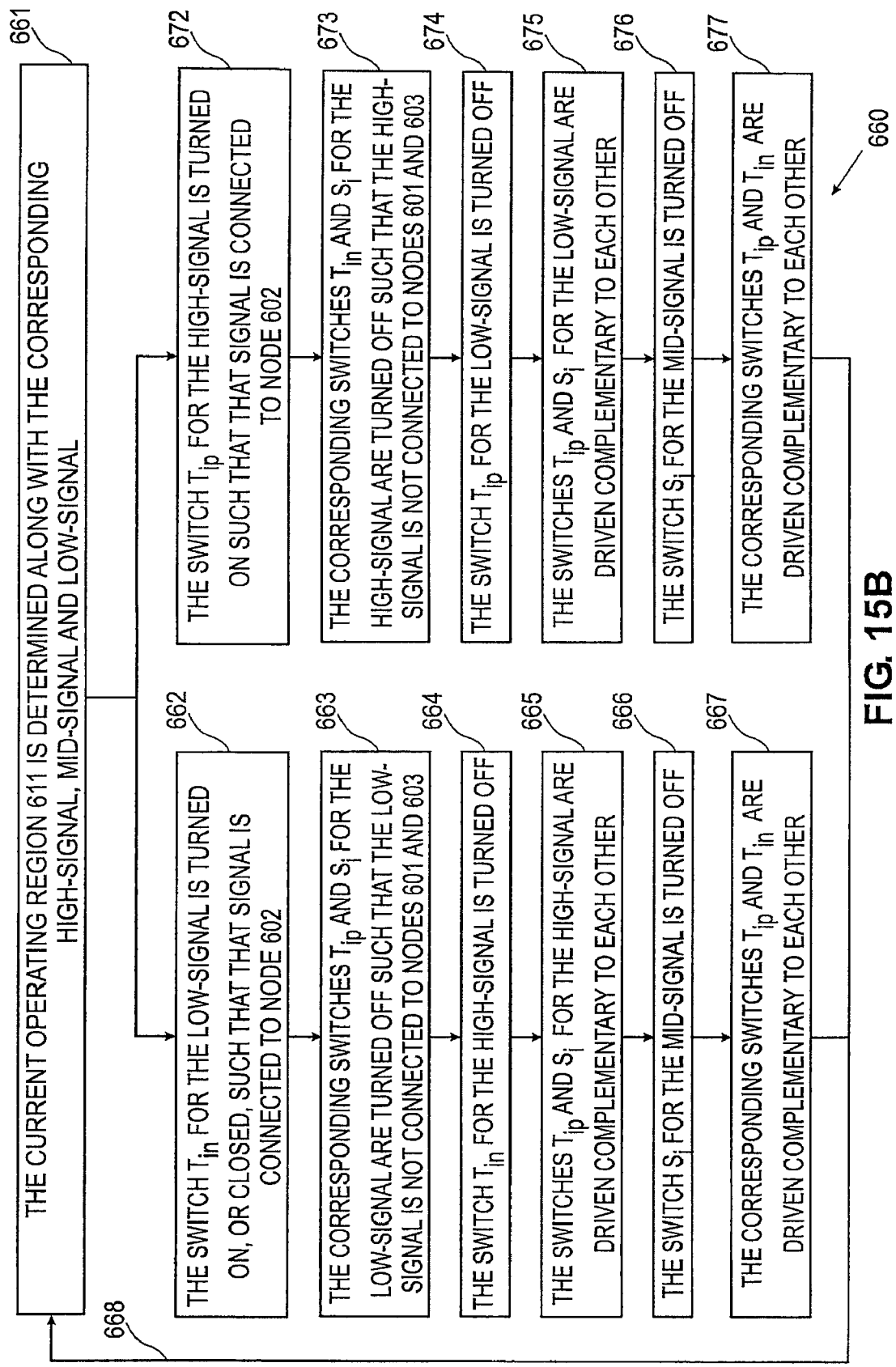
FIG. 15B is a flow diagram depicting another exemplary modulation method for controlling a power converter.

FIG. 15B is a flow chart depicting the exemplary modulation method 660 for use with the operating regions 611 depicted in FIG. 15A. In modulation method 660, the switches 604 and 605 in power converter 501 are driven open or closed based on the current operating region 611. At 661, the current operating region 611 is determined along with the corresponding high-signal, mid-signal, low-signal, dominant and non-dominant signals. If the dominant signal is the low-signal, then the method proceeds to steps 662-668. If the dominant signal is the high-signal, then the method proceeds to steps 672-678.

If the dominant signal is the low-signal, then at 662 the switch $T_{in}$ for the low-signal is turned on, or closed, such that that signal is connected to node 602. At 663, the corresponding switches $T_{ip}$ and $S_i$ for the low-signal are turned off such that the low-signal is not connected to nodes 601 and 603. At 664, the switch $T_{in}$ for the high-signal is turned off. At 665, the switches $T_{ip}$ and $S_i$ for the high-signal are driven complementary to each other, the duty ratio of $S_i$ being defined by $d_p$. At 666, the switch $S_i$ for the mid-signal is turned off, while at 667, the corresponding switches $T_{ip}$ and $T_{in}$ are driven complementary to each other, the duty ratio of $T_{in}$ being defined by $d_n$. At 668, the method reverts to 661 and repeats for the next operating region 611.

If the dominant signal is the high-signal, then at 672 the switch $T_{ip}$ for the high-signal is turned on such that that signal is connected to node 602. At 673, the corresponding switches $T_{in}$ and $S_i$ for the high-signal are turned off such that the high-signal is not connected to nodes 601 and 603. At 674, the switch $T_{ip}$ for the low-signal is turned off. At 675, the switches $T_{ip}$ and $S_i$ for the low-signal are driven complementary to each other, the duty ratio of $S_i$ being defined by $d_p$. At 676, the switch $S_i$ for the mid-signal is turned off, while at 677, the corresponding switches $T_{ip}$ and $T_{in}$ are driven complementary to each other, the duty ratio of $T_{ip}$ being defined by $d_n$. At 668, the method reverts to 661 and repeats for the next operating region 611. It should be noted that steps 662-668 and 672-678 do not have to be performed in the order they are listed and can be performed in any order, including simultaneously.

Similar to modulation methods 630 and 640, modulation method 650 is a vector-controlled method that can allow the power converter 501 depicted in FIG. 12 to be decoupled into a simpler equivalent circuit for every operating region 611 depicted in FIG. 15A. FIG. 15C depicts an exemplary embodiment of power converter 501 resulting from the application of modulation method 660 during operating region 611 occurring from 0 to 30 degrees. Here, line B is connected directly to node 603, while switches $T_{bp}$ and $T_{cn}$ have been removed. One of skill in the art will readily recognize that the application of modulation method 660 to power converter 501 will result in a different equivalent circuit for each operating region 611.

The DC gain equation for modulation method 660 is given in equation (5) below:

$$\begin{bmatrix} 1 - \frac{d_p}{2} \\ 1 - d_n \end{bmatrix} = \frac{1}{2E}\begin{bmatrix} 2 & 1 \\ 1 & 2 \end{bmatrix}\begin{bmatrix} v_p \\ v_n \end{bmatrix} \quad (5)$$

where $d_p$ and $d_n$ are duty ratios, E is the voltage between the P and N nodes and $v_p$ and $v_n$ are the voltages at the P node and N node, respectively. FIG. 15D depicts a table 669 showing the duty ratios $d_p$ and $d_n$ and the voltages $v_p$ and $v_n$ for each operating region 611 of modulation method 660.

A common goal in many power converter applications, including PFC, APF, GCI, and SVC, is that the line currents remain proportional to the line voltages and the phase difference between the line currents and line voltages is a desired value. For instance, the angle θ is zero for PFC and APF, is 180° for GCI, and is + or −90° for SVC. It is possible for the angle θ to be between −180° and 180°, i.e., it is possible for the power converter 501 to draw or inject real power, reactive VAR or a combination of both. This control goal is expressed in equation (6) below:

$$\begin{bmatrix} i_a \\ i_b \\ i_c \end{bmatrix} = G_e \cdot e^{j\theta} \cdot \begin{bmatrix} v_a \\ v_b \\ v_c \end{bmatrix} + G_i \cdot \begin{bmatrix} v_a \\ v_b \\ v_c \end{bmatrix} \quad (6)$$

where $G_e \cdot e^{j\theta}$ denotes conductance relating to the active and reactive power processed by the converter 501, $G_i$ denotes conductance relating to the internal power of the power converter 501 and θ is in the range of 0°~360°.

When θ=0°, $G_e \cdot e^{j\theta}$ becomes a positive real constant $G_e$, and equation (4) represents a control goal equation for PFC and APF type converters 501. When θ=180°, $G_e \cdot e^{j\theta}$ becomes a negative real constant $-G_e$, and equation (4) represents the control goal equation for a GCI type power converter 501. When θ=90° or −90°, $G_e \cdot e^{j\theta}$ becomes a positive/negative complex constant with zero real part $j \cdot G_e$ or $-j \cdot G_e$, and equation (6) represents the control goal equation for an SVC type power converter 501.

By considering the sensor resistance, which is the gain between real currents and the currents (voltage signals) in controller 502, and performing several algebra manipulations, a general control goal equation for PFCs, APFs, SVCs, and GCI's can be expressed as equation (7) below:

$$\frac{1}{R_s \cdot G_i} \cdot \begin{bmatrix} R_s \cdot i_a \\ R_s \cdot i_b \\ R_s \cdot i_c \end{bmatrix} - \frac{G_e \cdot e^{j\theta}}{G_i} \cdot \begin{bmatrix} v_a \\ v_b \\ v_c \end{bmatrix} = \begin{bmatrix} v_a \\ v_b \\ v_c \end{bmatrix} \quad (7)$$

where $R_s$ represents the gain of the current sensors.

Based on equation (7), the control key equations for each region 611 in the modulation strategies 630, 640, 650 and 660 can be expressed below:

$$V_m \cdot \begin{bmatrix} 1 - d_p \\ 1 - d_n \end{bmatrix} = \begin{bmatrix} 2 & 1 \\ 1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & 1 \\ 1 & 2 \end{bmatrix} \cdot \begin{bmatrix} v_p \\ v_n \end{bmatrix} \quad (8)$$

in each region the values of $i_p$ and $i_n$ will correspond to the values of $v_p$ and $v_n$ for the particular region and modulation method 630, 640, 650 and 660.

Moreover, for PFC and APF type power converters 501, it can be assumed that $K \cdot i_{p,n} = v_{p,n}$, and equation (8) can be further simplified into equation (9) below:

$$V_m \cdot \begin{bmatrix} 1-d_p \\ 1-d_n \end{bmatrix} = \left(1 - \frac{G_e \cdot K}{R_s}\right) \cdot \begin{bmatrix} 2 & 1 \\ 1 & 2 \end{bmatrix} \cdot \begin{bmatrix} R_s \cdot i_p \\ R_s \cdot i_n \end{bmatrix} \quad (9)$$

It should be noted that the voltage signals are cancelled in this equation, thus allowing the control circuit to be further simplified. For GCI type power converters 501, similar algebraic manipulation can be done. However, a GCI power converter 501 based on the simplified equation (9) could make the power converter system 500 unstable.

The generalization of the control key equations for PFCs, APFs, STATCOMs, and GCIs in equation (8) allows the development of the universal controller 502 depicted in FIGS. 5 and 9. As mentioned above, the configuration of the reference signal source unit 512 allows the universal controller 502 to be implemented with all types of power converters 501, including, but not limited to PFC's, APF's, SVC's and GCI's. Although all derivation above is based on three-phase two-level converters and OCC, the concept can be easily extended to all other three-phase three-level configurations and modulation methods 630-660.

The control key equation for modulation method 630 can be expressed as equation (10) below:

$$V_m \cdot \begin{bmatrix} 1-d_p \\ 1-d_n \end{bmatrix} = \begin{bmatrix} 2 & -1 \\ -1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & -1 \\ -1 & 2 \end{bmatrix} \cdot \begin{bmatrix} v_p \\ v_n \end{bmatrix} \quad (10)$$

The control key equation for modulation method 640 can be expressed as equation (11) below:

$$V_m \cdot \begin{bmatrix} 1-2 \cdot d_p \\ 1-2 \cdot d_n \end{bmatrix} = \begin{bmatrix} 2 & -1 \\ -1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & -1 \\ -1 & 2 \end{bmatrix} \cdot \begin{bmatrix} v_p \\ v_n \end{bmatrix} \quad (11)$$

The control key equation for modulation method 650 can be expressed as equation (12) below:

$$V_m \cdot \begin{bmatrix} 1-2 \cdot d_p \\ 1-2 \cdot d_n \end{bmatrix} = \begin{bmatrix} 2 & -1 \\ -1 & 2 \end{bmatrix} \cdot \begin{bmatrix} R_s \cdot i_c \\ -R_s \cdot i_b \end{bmatrix} -$$

$$G_e \cdot e^{j\theta} \cdot \begin{bmatrix} 2 & -1 \\ -1 & 2 \end{bmatrix} \cdot \begin{bmatrix} v_c \\ -v_b \end{bmatrix} \quad (12)$$

The control key equation for modulation method 660 can be expressed as equation (13) below:

$$V_m \cdot \begin{bmatrix} 1-d_p/2 \\ 1-d_n \end{bmatrix} = \frac{1}{2} \cdot \begin{bmatrix} 2 & 1 \\ 1 & 2 \end{bmatrix} \cdot \begin{bmatrix} R_s \cdot i_p \\ R_s \cdot i_n \end{bmatrix} - \frac{G_e \cdot e^{j\theta}}{2} \cdot \begin{bmatrix} 2 & 1 \\ 1 & 2 \end{bmatrix} \cdot \begin{bmatrix} v_p \\ v_n \end{bmatrix} \quad (13)$$

Figure 16A:
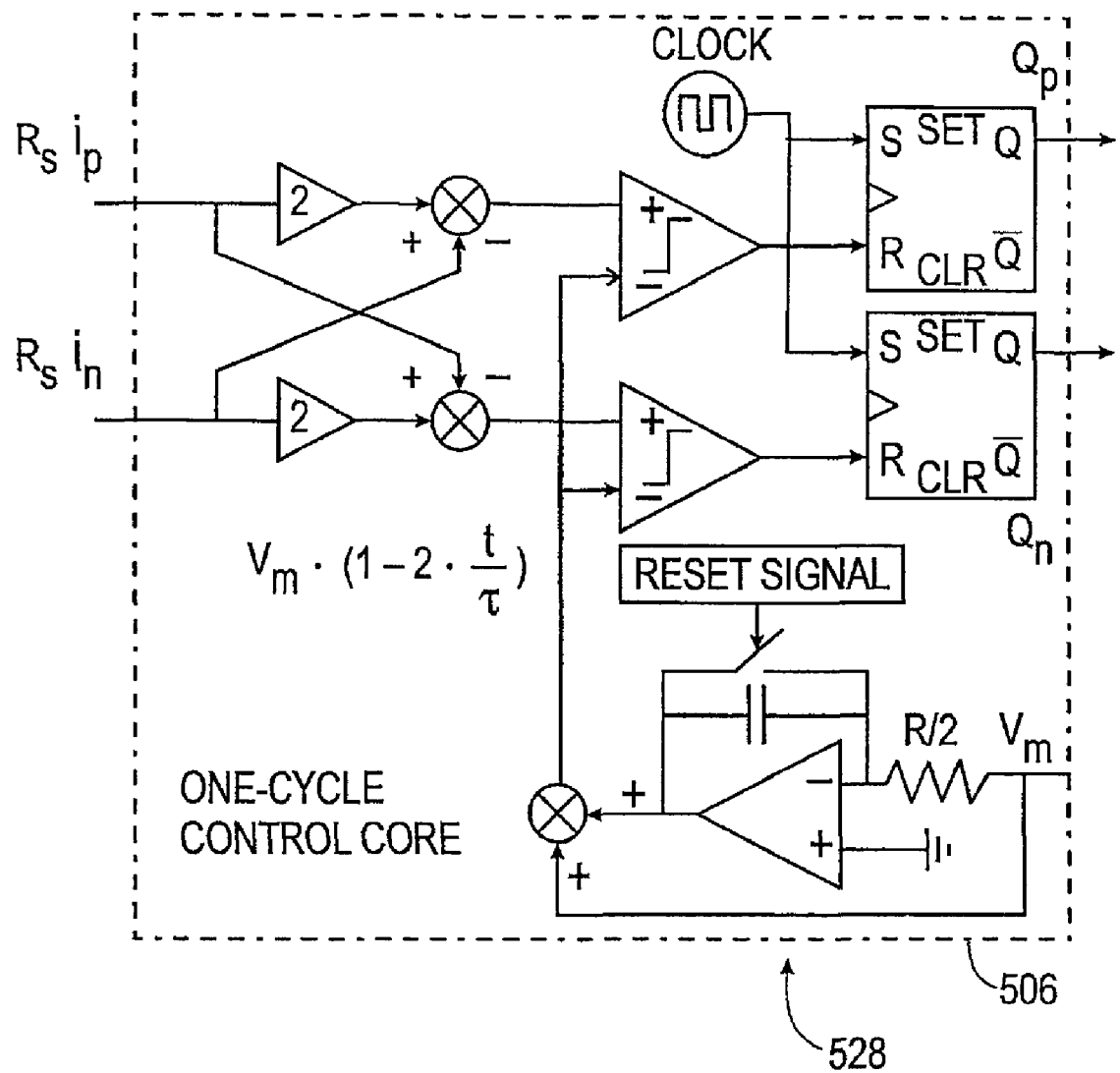
FIG. 16A is a schematic view depicting an exemplary embodiment of an OCC control core suitable for use with the modulation method depicted in FIG. 13B.
Figure 16B:
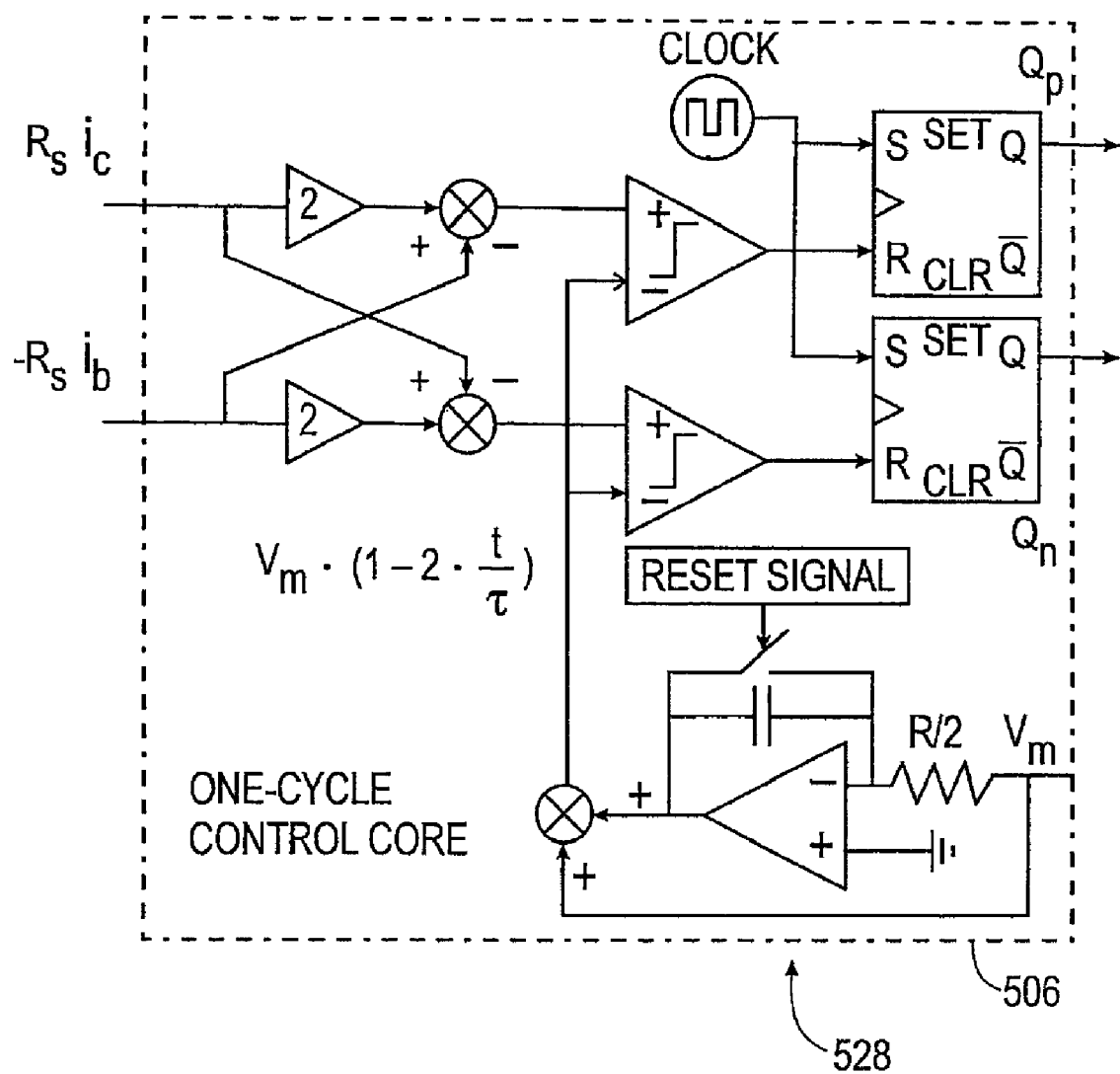
FIG. 16B is a schematic view depicting an exemplary embodiment of an OCC control core suitable for use with the modulation method depicted in FIG. 13E.
Figure 16C:
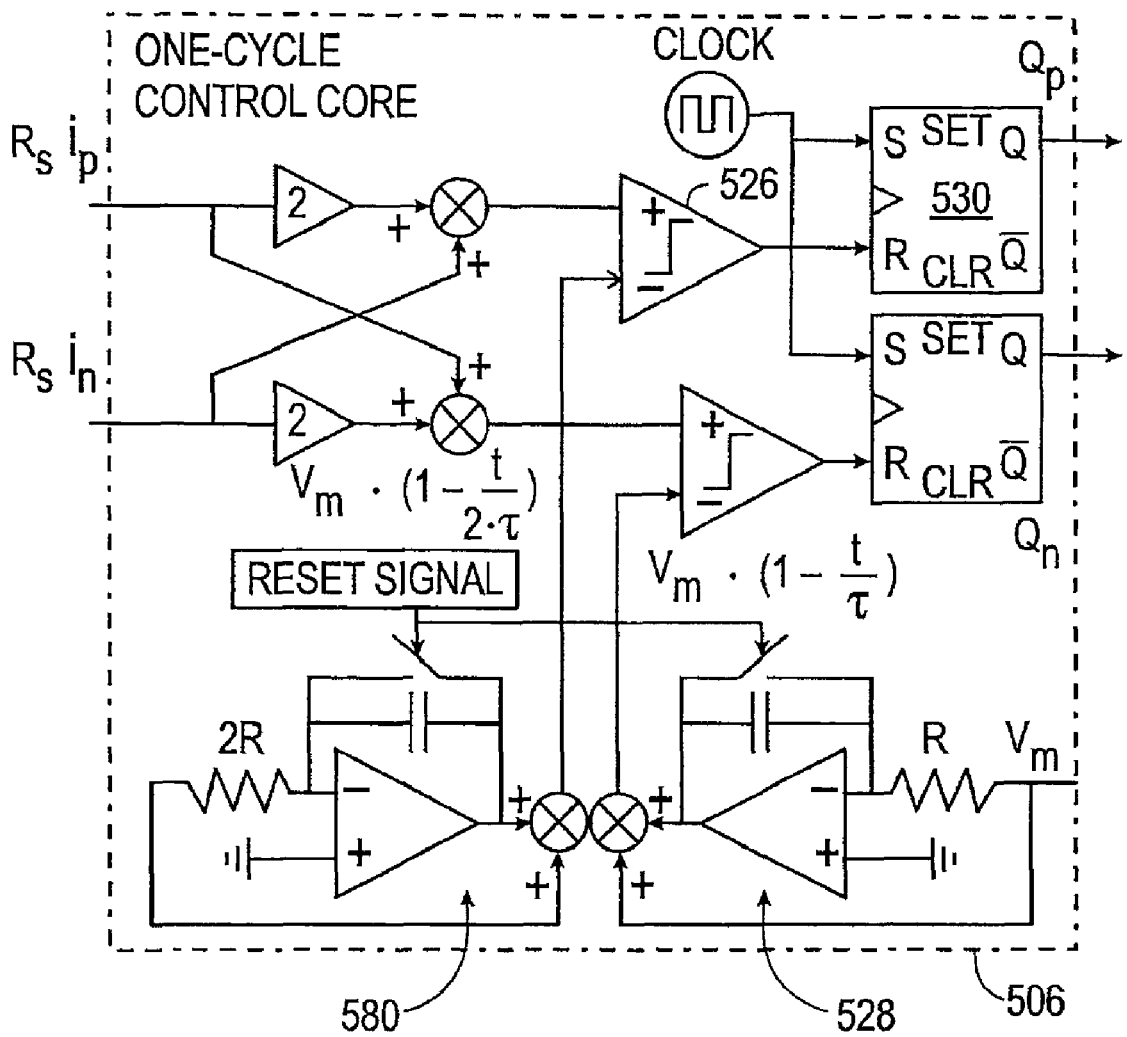
FIG. 16C is a schematic view depicting an exemplary embodiment of an OCC control core suitable for use with the modulation method depicted in FIG. 15B.

Using the concepts described in U.S. Pat. Nos. 6,297,980 and 6,545,887, the control key equations (10)-(13) can be used to implement universal controllers 502 configured to generate the pulse width modulated drive signals 507 for power converter 501. The input current signals $i_p$ and $i_n$ represent the currents of the non-dominant phases and in each region they can be selected by the proper logic circuits, such as input selection unit 504, region selection unit 508 and drive signal distribution unit 510 described above with respect to FIG. 5. FIG. 9 depicts an exemplary embodiment of an OCC control core 506 usable with modulation method 630. FIGS. 16A-C depict the three level control cores 506 usable with each of the three modulation methods 640-660. Because modulation method 650 relies only on $i_b$ and $i_c$, the input selection unit 504, region selection unit 508 and drive signal distribution unit 510 are not required.

FIG. 16A depicts an exemplary embodiment of OCC control core 506 configured for implementation in universal controller 502 with modulation method 540. This embodiment is similar to the embodiment described above with respect to FIG. 9 with the exception that the resistance of the input resistor for integrator 528 is halved.

FIG. 16B depicts another exemplary embodiment of OCC control core 506 configured for implementation in universal controller 502 with modulation method 550. This embodiment is similar to the embodiment described above with respect to FIG. 16A with the exception that because only the input currents $i_b$ and $i_c$ are used, this embodiment of control core 506 can be implemented in universal controller 502 without input selection unit 504, region selection unit 508 and drive signal distribution unit 510.

FIG. 16C depicts another exemplary embodiment of OCC control core 506 configured for implementation in universal controller 502 with modulation method 560. This embodiment is similar to the embodiment described above with respect to FIG. 9 with the exception that a second integrator 580 is provided having an input resistance twice that of the other integrator 528. The outputs of each this second integrator 580 is fed to the comparator 526 coupled with the $Q_p$ flip-flop 530.

Figure 17A:
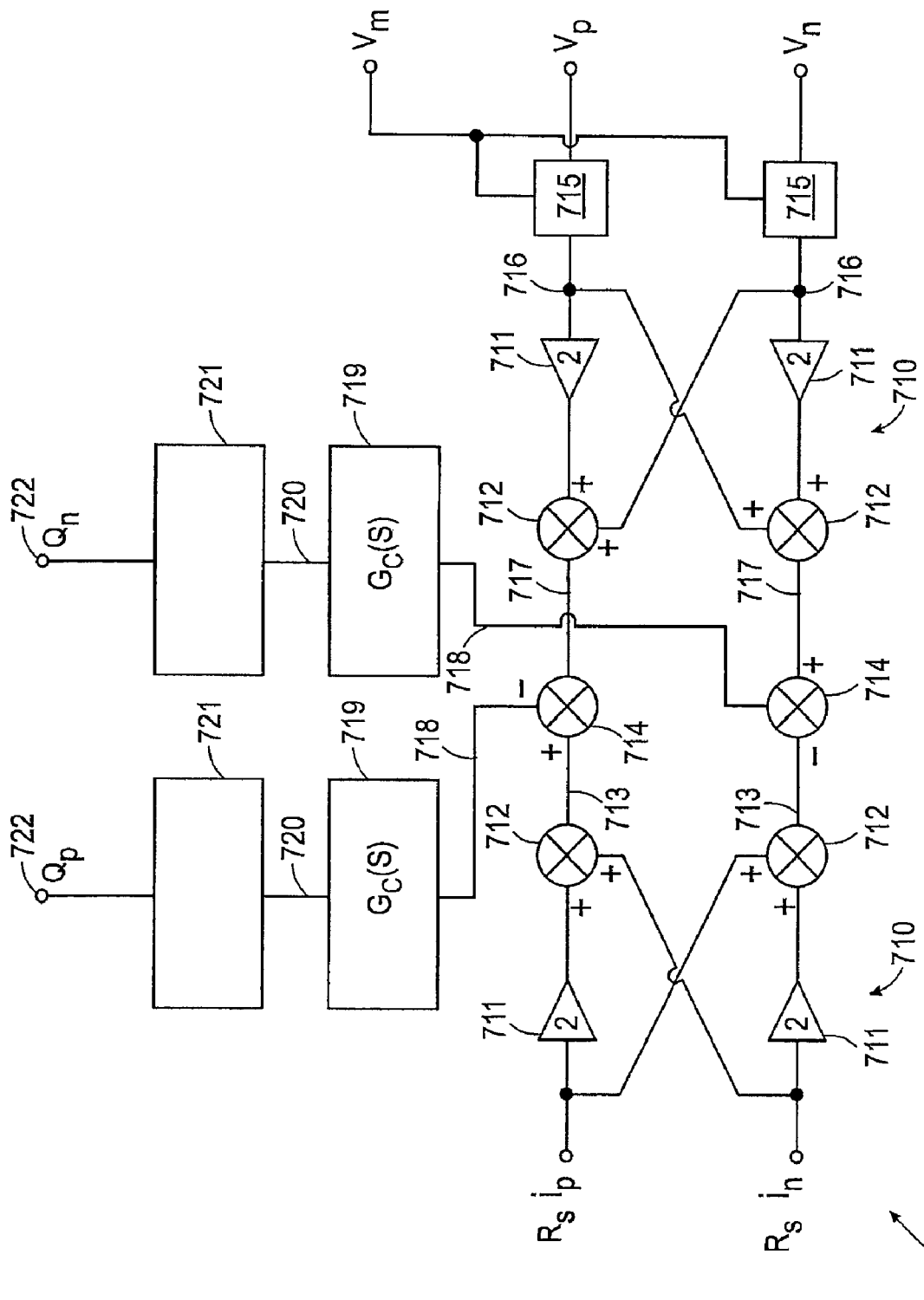
FIGS. 17A-C are schematic views depicting additional exemplary embodiments of control cores.
Figure 17B:
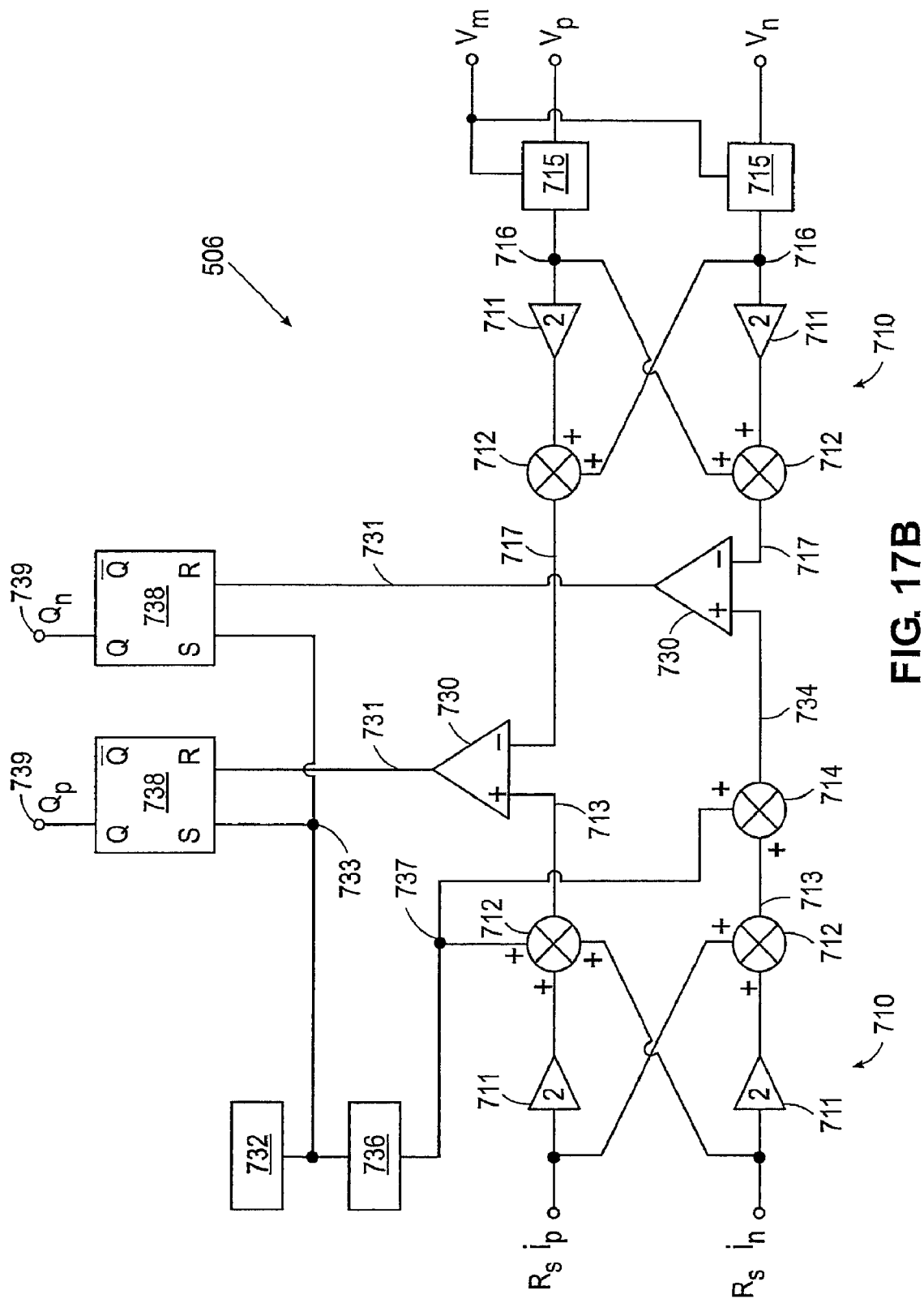
Figure 17C:
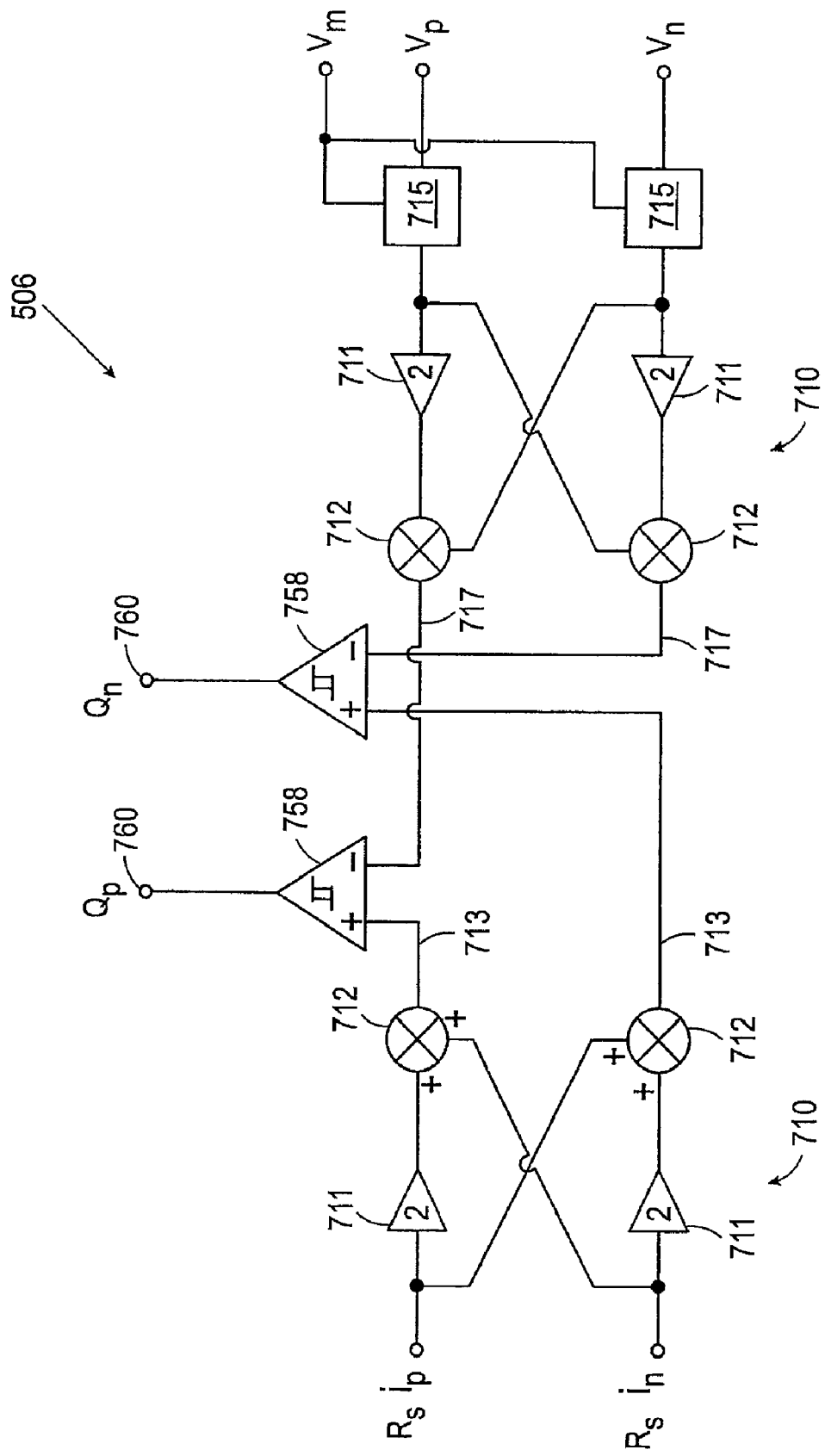

In addition to the OCC cores 506 depicted in FIGS. 16A-C, other cores 506 using different control methodologies can also be used with system 500. FIGS. 17A-C depict additional configurations of control core 506. FIG. 11A depicts an exemplary embodiment of control core 506 configured as an average current mode control core. In this embodiment, two vector voltage signals, $v_p$ and $v_n$, and two current signals, $i_p$ and $i_n$, are selected for each operating region 611, depending on the particular modulation method 630-660 used. The $i_p$ and $i_n$ signals are input to a linear combination circuit 710 having cross-coupled amplifiers 711 and adders 712. The output signals 713 from this linear combination circuit 710 are output to adders 714.

The voltage signals $v_p$ and $v_n$ are input to multipliers 715 where they are multiplied by $V_m$ to form scalable voltage signals 716 ($V_p * V_m$ and $V_n * V_m$). These voltage signals 716 are then input into a second linear combination circuit 710, which outputs signals 717 to adders 714. Adders 714 add signals 717 and 713 and output the combined signals 718 to compensators 719, each preferably having the function $G_c(s)$. Compensators 719 preferably output signal 720 to a pulse width modulation unit 721, which preferably compares signal 720 to a sawtooth or triangular signal (not shown) in order to perform pulse width modulation (PWM). The resulting modulated signal 722, $Q_p$ and $Q_n$, are the drive signals 507 for the power converter 501. These signal 722 are preferably channeled or routed to the proper switches 604 or 605 according to the modulation method 630-660.

FIG. 17B depicts another exemplary embodiment of control core 506 configured as a current mode control core. Similar to the embodiment described with regard to FIG. 17A, in this embodiment two vector voltage signals, $v_p$ and $v_n$, and two current signals, $i_p$ and $i_n$, are selected for each operating region 611, depending on the particular modulation method 630-660 used. The voltage signals $v_p$ and $v_n$ are input to multipliers 715 to be multiplied by the voltage signal $V_m$ to form scalable voltage signals 716 ($V_p*V_m$ and $V_n*V_m$). These voltage signals 716 are then input into a linear combination circuit 710, which outputs signals 717 to the negative input of comparators 730.

The $i_p$ and $i_n$ signals are input to a linear combination circuit 710 having cross-coupled amplifiers 711 and adders 712. A clock 732 generates a clock signal 733, which is preferably used to generate a synchronized sawtooth signal 737 at synchronizer 736. This sawtooth signal 737 is added to the sum of the amplified $R_s i_p$ signal and the $R_s i_n$ signal at one adder 712. The output signal 713 from the adder 712 is input to the positive input of one of the comparators 730. The sawtooth signal 737 is added to the sum of the amplified $R_s i_n$ signal and the $R_s i_p$ at adder 714, the output signal 734 of the adder 714 is input to the positive input of the other comparator 730, as depicted in FIG. 17B.

The output signals of the comparators 730 are input to flip-flops 738, which in this embodiment, is the R input of the S-R flip-flops 738. The clock signal 733 is input to the S input of the flip-flops 738. The clock signal 733 sets each flip-flop 738 and when each comparator output 731 changes state, the corresponding flip-flop 738 will reset. The resulting flip-flop output signals 739, $Q_p$ and $Q_n$, are the drive signals 507 for the power converter 501. These signal 739 are preferably channeled or routed to the proper switches 604 or 605 according to the modulation method 630-660.

FIG. 17C depicts an exemplary embodiment of control core 506 configured as a sliding mode control core. Similar to the embodiments discussed above with respect to FIGS. 17A-B, in this embodiment two vector voltage signals, $v_p$ and $v_n$, and two current signals, $i_p$ and $i_n$, are selected for each operating region 611, depending on the particular modulation method 630-660 used. The voltage signals $v_p$ and $v_n$ are input to multipliers 715 to be multiplied by the voltage signal $V_m$ to form scalable voltage signals 716. These voltage signals 716 are then input into a linear combination circuit 710, which outputs signals 717 to the negative input of the Schmidt triggers 758. The $i_p$ and $i_n$ signals are input to another linear combination circuit 710 and the output signals 713 from this linear combination circuit 710 are input to the positive inputs of the Schmidt triggers 758. The Schmidt triggers 758 generate variable frequency output signals 760, $Q_p$ and $Q_n$, which are the drive signals 507 for the power converter 501. These signals 760 are preferably channeled or routed to the proper switches 604 or 605 according to the modulation method 630-660. In order to reduce the variable frequency of signals 760 or provide a constant frequency, other circuits such as a phase lock loop (PLL) or variable hysteresis Schmidt trigger and the like can be substituted for Schmidt triggers 758.

Figure 1A:
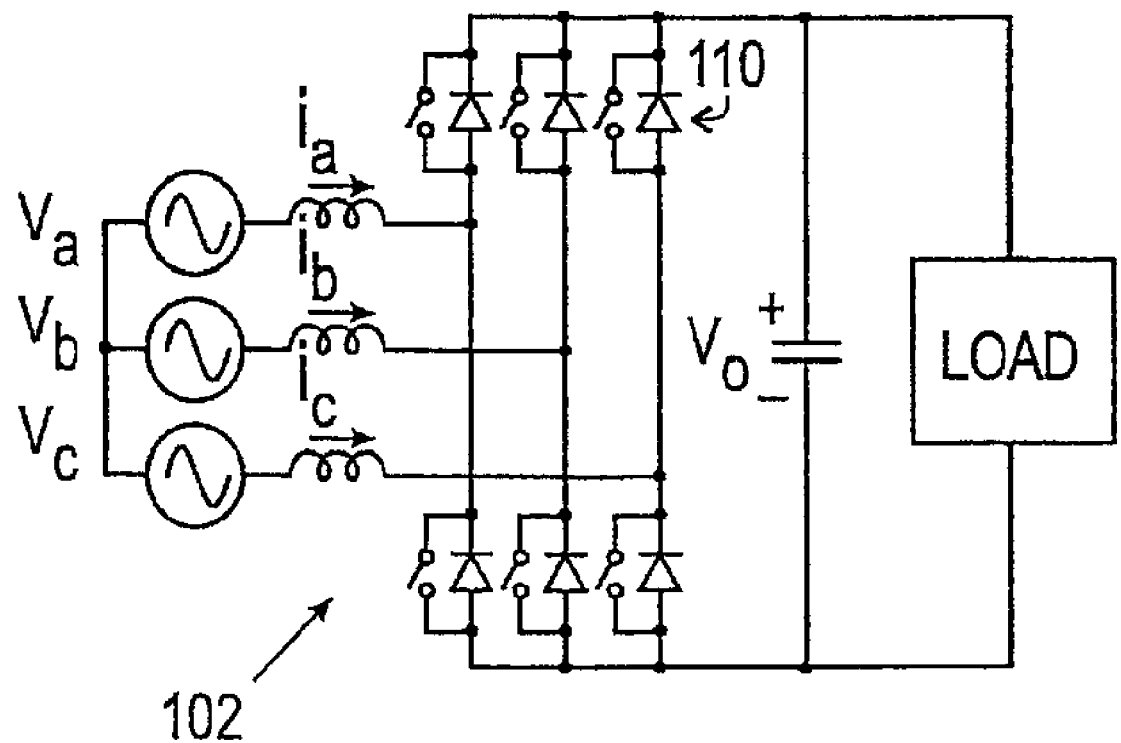
FIG. 1A is a schematic view depicting an exemplary PFC rectifier power converter.
Figure 2A:
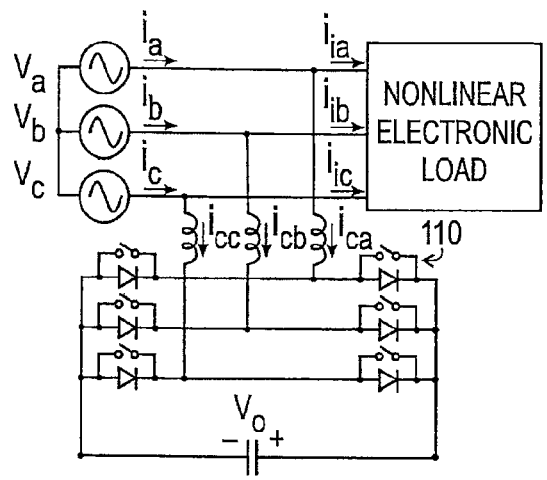
FIG. 2A is a schematic view depicting an exemplary APF power converter.
Figure 2B:
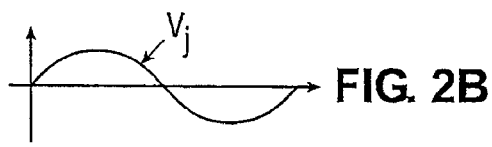
FIGS. 2B-C are graphs of voltage versus time depicting various input signals for the APF power converter depicted in FIG. 2A.
Figure 2C:
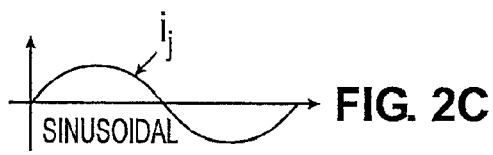
Figure 2D:
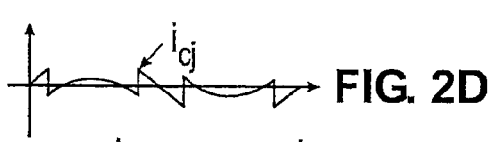
FIG. 2D is a graph of voltage versus time depicting a voltage signal applied to the input signals for the APF power converter depicted in FIG. 2A.
Figure 2E:
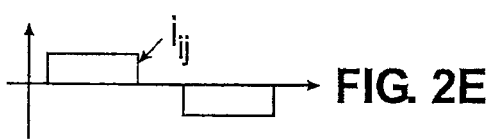
FIG. 2E is a graph of voltage versus time depicting an output signal for the APF power converter depicted in FIG. 2A.
Figure 3A:
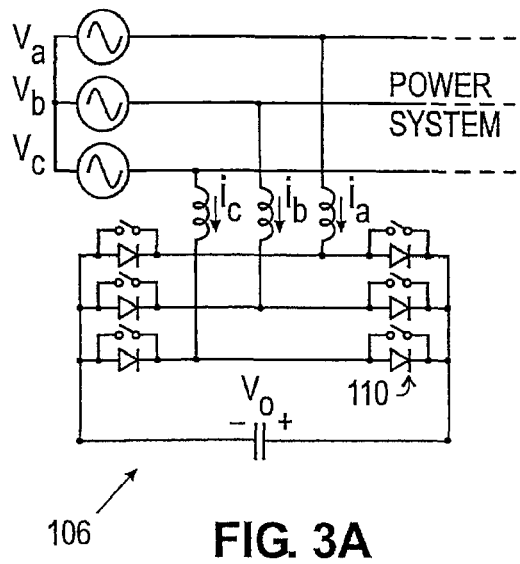
FIG. 3A is a schematic view depicting an exemplary SVC power converter.
Figure 3B:
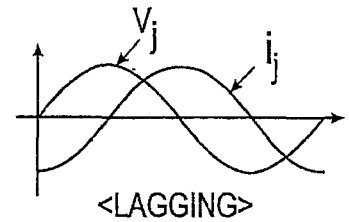
FIGS. 3B-C are graphs of voltage versus time depicting various input and output signals for the SVC power converter depicted in FIG. 3A.
Figure 3C:
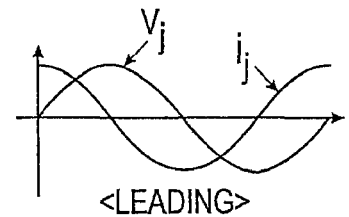
Figure 4A:
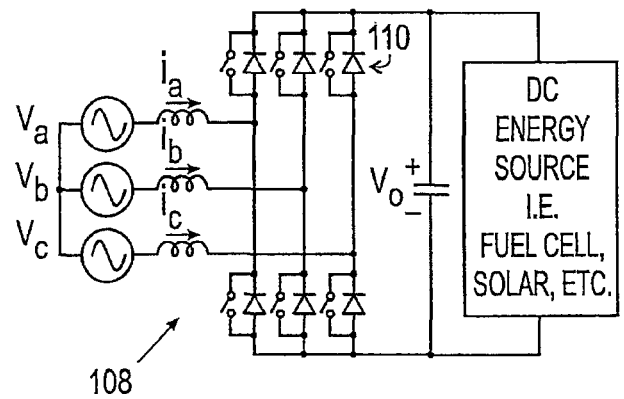
FIG. 4A is a schematic view depicting an exemplary GCI power converter.
Figure 4B:
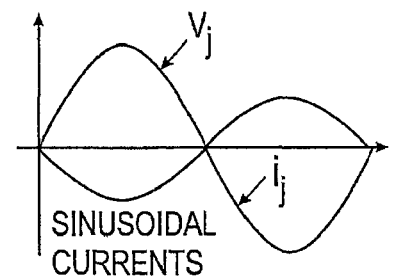
FIG. 4B is a graph of voltage versus time depicting various input and output signals for the GCI power converter depicted in FIG. 4A.
Figure 18A:
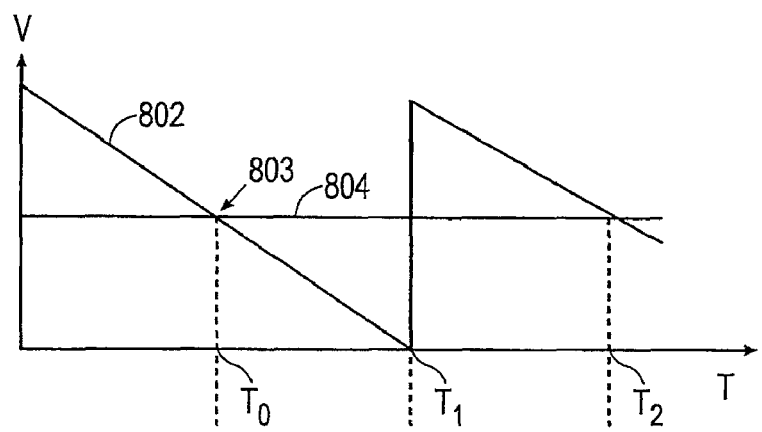
FIG. 18A is a graph of voltage versus time depicting exemplary voltage signals for a PFC rectifier operating with a heavy load.
Figure 18B:
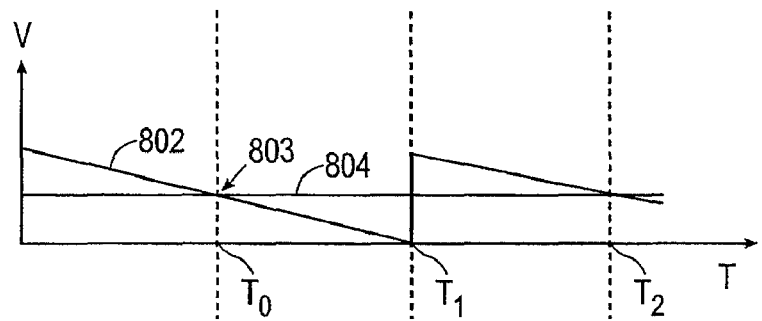
FIG. 18B is a graph of voltage versus time depicting exemplary voltage signals for a PFC rectifier operating with a light load.
Figure 18C:
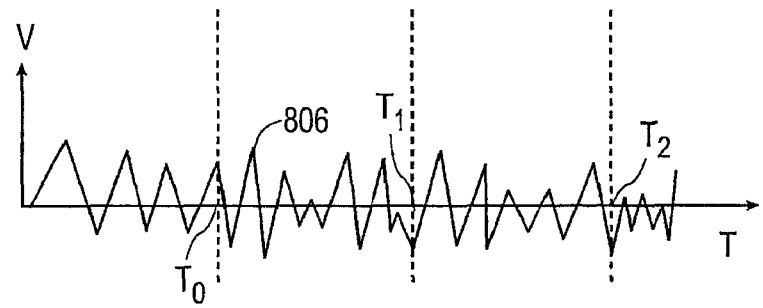
FIG. 18C is a graph of voltage versus time depicting exemplary noise signals for a PFC rectifier.
Figure 18D:
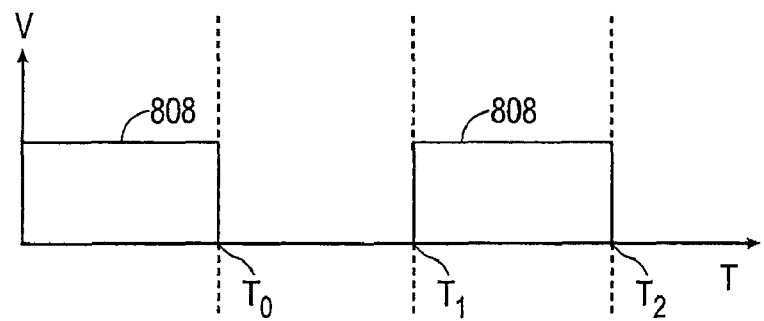
FIG. 18D is a graph of voltage versus time depicting exemplary pulse width modulation signals for a PFC rectifier.

The systems and methods described herein also provide for a method of improving performance of three phase two-level and three-level PFC rectifiers, similar to the one depicted in FIG. 1A, having a light load. FIG. 18A depicts an exemplary graph of voltage versus time for a $V_m$ signal 802 and an $i_p$ or $i_n$ signal 804 in a PFC rectifier operating with a relatively heavy load, while FIG. 18B depicts the same signals under a relatively light or zero load. Because the currents are close to constant in a PFC rectifier, the $i_p$ or $i_n$ signal 804 is represented in both FIGS. 18A-B as a straight line. FIG. 18C depicts an exemplary graph of voltage versus time showing a noise level 806 for the PFC rectifier. FIG. 18D depicts an exemplary graph of voltage versus time showing PWM driving signals 808 for the PFC rectifier. Because the signals 802 and 804 remain proportional the crossing point 803 between signal 802 and 804 does not change under varying load levels, the PWM driving signals 808 are preferably kept constant over the varying load levels in order to maintain the same level of input to output DC gain. Here, the crossing points 803 used to generate the PWM signals 808 occur at $T_0$, $T_1$ and $T_2$.

As can be seen in FIGS. 18A-B, the peak-to-peak voltage range of the $V_m$ signal 802 and the slope of the signal 802 is much greater under the heavy, or substantial, loads than under light loads. As a result, noise 806 has a lesser effect on the $V_m$ signal 802 under heavy loads than under light loads. Thus, the PFC rectifier can become unstable at light loads preventing proper operation.

Figure 18E:
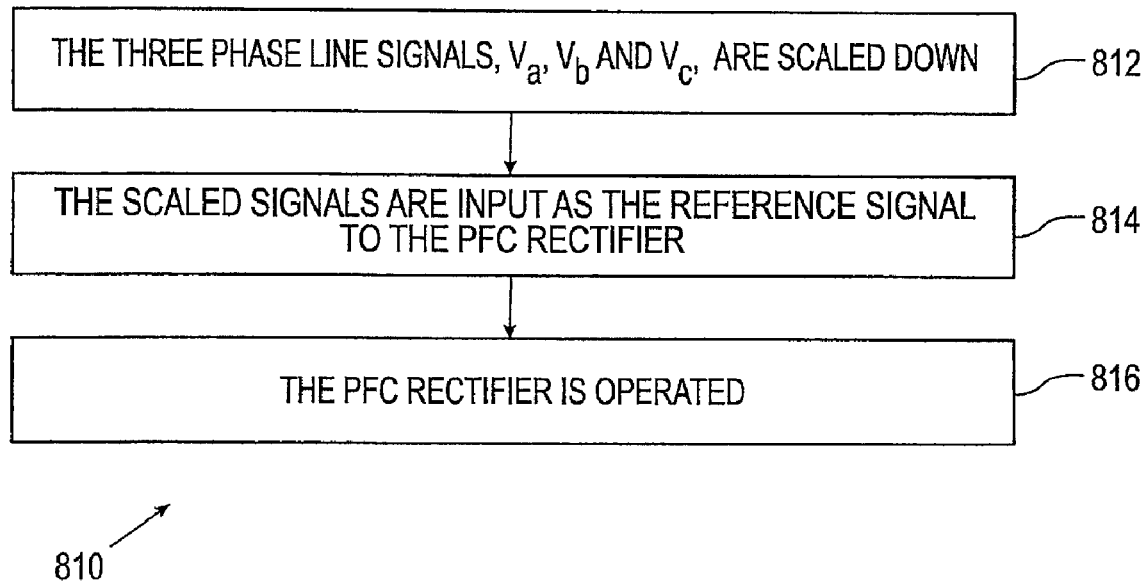
FIG. 18E is a flow diagram depicting an exemplary voltage limiting method.

FIG. 18E depicts an exemplary limiting method 810, which can be used to limit the minimum level of signal 802 and improve the performance of the PFC rectifier. At 812, the three phase line signals, $V_a$, $V_b$ and $V_c$, are scaled down, for instance, to 5% of the level of current signals 804 under heavy load conditions. At 814, these scaled signals are input as the reference signal to the PFC rectifier, instead of ground. This limits the minimum values of signals 802 and 804. At 816, the PFC rectifier is operated. The injected reference signals are small compared to the signals 804 under heavy load conditions and will only increase the voltage signals $V_a$, $V_b$ and $V_c$ a small amount. Method 810 can also be used in APF, SVC and various other power converters 501 to remedy instability problems under light loads.

The systems and methods described herein also provide for improving performance for APF or SVC and other similar converters 501 having nonlinear loads. In order to closely follow the current flowing through a nonlinear load, the value of the inductive elements 606 is desired to be relatively low. However, this low inductance increases the harmonic currents through the inductive element 606 at or near the switching frequency. This can result in unacceptable levels of THD under light load conditions.

In order to remedy this, the switching frequency of the universal controller 502 is adjusted according to the load level. The minimum switching frequency and inductance values are preferably selected to satisfy the ripple and THD requirements under heavy loads first. Then, the switching frequency can be increased when the load is reduced allowing the THD levels to be acceptable under both heavy and light, or zero, loads.

One of skill in the art will readily recognize that all embodiments described herein can be implemented using digital components, instead of, or in addition to analog components. Therefore, the systems and methods described herein are not limited to analog implementations of the control system 500 and the various constituent components, and include both digital implementations and analog/digital combinations of system 500, universal controller 502 and the various components described herein.

Other advantages of embodiments of the universal controller 502 using an OCC core 506 include digital form control, operation under balanced or unbalanced grid conditions and robust and stable operation with solid global convergence to increase stability. Furthermore, these OCC controllers 502 can operate without multipliers, added software or harmonics calculations. The number of components are also reduced over conventional circuits by several orders of magnitude.

In the foregoing specification, the invention has been described with reference to specific embodiments thereof It will, however, be evident that various modifications and changes may be made thereto without departing from the broader spirit and scope of the invention. As an example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A control core configured to implement a control key equation to produce a plurality of drive signals for a three-phase two or three-level converter, having a reference signal selection unit that is adjustable to allow for the control of any one of a PFC, APF, VAR, or GCI converter; wherein
   a voltage signal $V_m$ is used to multiply a sawtooth or triangular signal to form a scalable sawtooth or triangular signal; and
   the sawtooth or triangular signal is input into two comparators to compare with two output signals from a signal adjustment unit, resulting in trailing edge, leading edge, or double edge signals $Q_p$ and $Q_n$.

2. The control core in claim 1, wherein:
   a combination of selected line current signals and reference signals are inputs to the signal adjustment unit;
   a constant value is integrated by an integrator and then added to itself by an adder (subtractor);
   an output from the adder (subtractor) is multiplied by the voltage signal $V_m$ and is compared with two output signals from the signal adjustment unit using the two comparators;
   two flip-flops are set by an arrival of a clock signal and reset by a change of state of output signals of the comparators, resulting in drive signals $Q_p$ and $Q_n$; and
   the integrator is reset any time after the flip-flops are reset and before the end of a next switching cycle.

3. The control core in claim 1, wherein:
   a combination of selected line current signals and reference signals are inputs to the signal adjustment unit;
   a voltage signal $V_m$ is integrated by an integrator and then added to itself by an adder (subtractor);
   an output signal from the adder (subtractor) is compared to the two output signals from the signal adjustment unit;
   two flip-flops are set by an arrival of a clock signal and reset by a change of state of output signals from the comparators, resulting in drive signals $Q_p$ and $Q_n$; and
   the integrator is reset any time after the flip-flops are reset and before the end of a next switching cycle.

4. A control core within a three-phase controller configured to implement a control key equation to produce a plurality of drive signals for a two or three-level converter, comprising:
   a first and a second pulse-width modulator; and
   a reference signal selection unit that is adjustable to allow the controller to control any one of a PFC, APF, VAR, or GCI converter, wherein:
   the first and second pulse-width modulators are each based on comparing a signal with a saw-tooth or triangle waveform;
   two vector voltage signals, $v_p$ and $v_n$, and two current signals, $i_p$ and $i_n$, are selected for each operating region;
   the two current signals $i_p$ and $i_n$ are input to two input terminals of a first signal adjustment unit;
   the two voltage signals $v_p$ and $v_n$ are input to two multipliers respectively and each is multiplied by a voltage signal $V_m$ to form two scalable voltage signals $(V_p*V_m)$ and $(V_n*V_m)$;
   the two scalable voltage signals $(V_p*V_m)$ and $(V_n*V_m)$ are input into two input terminals of a second signal adjustment unit;
   output signals of the first and second signal adjustment units are combined by two adders (subtractors) respectively;
   output signals from the two adders (subtractors) are compensated by two compensators respectively to produce two compensated output signals, each compensator having a function $G_c(s)$; and
   the two compensated output signals are compared with a sawtooth or triangular signal in order to produce leading edge, trailing edge, or double edge pulse width modulation (PWM) drive signals $Q_p$ and $Q_n$.

5. The control core in claim 4, wherein the first and the second pulse width modulators are each based on an integrator with reset.

6. A control core within a three-phase controller configured to implement a control key equation to produce a plurality of drive signals for a two or three-level converter, comprising:
   a first and a second pulse-width modulator; and
   a reference signal selection unit that is adjustable to allow the controller to control any one of a PFC, APF, VAR, or GCI converter, wherein:
   two vector voltage signals, $v_p$ and $v_n$, and two current signals, $i_p$ and $i_n$, are selected for each operating region;
   the two voltage signals $v_p$ and $v_n$ are input to two multipliers and each is multiplied by a voltage signal $V_m$ to form scalable voltage signals $(V_p*V_m)$ and $(V_n*V_m)$;
   the two scalable voltage signals $(V_p*V_m)$ and $(V_n*V_m)$ and the two current signals $i_p$ and $i_n$ are combined by two adders (subtractors);
   output signals from the two adders (subtractors) are then input into two input terminals of a signal adjustment unit;
   two output signals from the signal adjustment unit are compensated by a compensator having a function $G_c(s)$ to produce two compensated signals; and
   the two compensated signals are compared with a sawtooth or triangular signal in order to produce leading edge, trailing edge, or double edge pulse width modulation (PWM) drive signals $Q_p$ and $Q_n$.

7. A control core within a three-phase controller configured to implement a control key equation to produce a plurality of drive signals for a two or three-level converter, comprising:
   a first and a second pulse-width modulator; and
   a reference signal selection unit that is adjustable to allow the controller to control any one of a PFC, APF, VAR, or GCI converter, wherein:
   two vector voltage signals, $v_p$ and $v_n$, and two current signals, $i_p$ and $i_n$, are selected for each operating region;
   the two voltage signals $v_p$ and $v_n$ are input to two multipliers and each is multiplied by a voltage signal $V_m$ to form scalable voltage signals $(V_p*V_m)$ and $(V_n*V_m)$;
   the two scalable voltage signals $(V_p*V_m)$ and $(V_n*V_m)$ are input into two input terminals of a signal adjustment unit to produce two output signals that are respectively sent to two comparators;
   a clock generates a clock signal, which is used to generate a synchronized sawtooth signal;
   the $i_p$ and $i_n$ signals are input to a signal adjustment unit having two output signals, and the two output signals are linearly combined with the sawtooth signal and sent to the two comparators; and
   flip-flops are set by an arrival of the clock signal and reset by a change of state of the comparators, resulting in output signals $Q_p$ and $Q_n$.

8. A control core within a three-phase controller configured to implement a control key equation to produce a plurality of drive signals for a two or three-level converter, comprising:
   a first and a second pulse-width modulator; and a reference signal selection unit that is adjustable to allow the controller to control any one of a PFC, APF, VAR, or GCI converter, wherein:

two vector voltage signals, $v_p$ and $v_n$, and two current signals, $i_p$ and $i_n$, are selected for each operating region;

the two voltage signals $v_p$ and $v_n$ are input to two multipliers and each is multiplied by a voltage signal $V_m$ to form scalable voltage signals ($V_p*V_m$) and ($V_n*V_m$);

the two scalable voltage signals ($V_p*V_m$) and ($V_n*V_m$) are input into a first signal adjustment unit, the first signal adjustment unit outputting signals to a first set of input terminals of a Schmidt trigger;

the $i_p$ and $i_n$ signals are input to a second signal adjustment unit having two cross coupled amplifiers and two adders, the second signal adjustment unit outputting signals to a second set of input terminals of the Schmidt trigger; and the Schmidt trigger generates variable frequency output signals $Q_p$ and Q.

9. A control core, comprising:
a reference signal selection unit that is adjustable to allow for the control of any one of a PFC, APF, VAR, or GCI converter; and an analog, digital, FPGA, microprocessor, and/or microcontroller circuitry configured to implement a control key equation to produce leading edge, trailing edge, or double edge PWM modulation signals to control a three-phase three-level power converter, wherein the control key equation is:

$$V_m \cdot \begin{bmatrix} 1-d_p \\ 1-d_n \end{bmatrix} = \begin{bmatrix} 2 & 1 \\ 1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & 1 \\ 1 & 2 \end{bmatrix} \cdot \begin{bmatrix} v_p \\ v_n \end{bmatrix}$$

wherein:
$G_e$ is a gain value, $\theta$ is a phase offset value,
$V_m$ is an output signal of a voltage loop compensator,
$d_p$ and $d_n$ are duty ratio drive signals from the control core,
$i_p$ and $i_n$ are selected line current signals from a signal selection unit,
$R_s$ is a sensing resistance for the line current signals,
$v_p$ and $v_n$ are selected voltage signals from the signal selection unit, and
p and n are valued a and c, b and c, b and a, c and a, c and b, or a and b respectively depending on the region.

10. A control core, comprising:
a reference signal selection unit that is adjustable to allow for the control of any one of a PFC, APF, VAR, or GCI converter; and an analog, digital, FPGA, microprocessor, and/or microcontroller circuitry configured to implement a control key equation to produce leading edge, trailing edge, or double edge PWM modulation signals to control a three-phase three-level power converter, wherein the control key equation is:

$$V_m \cdot \begin{bmatrix} 1-d_p \\ 1-d_n \end{bmatrix} = \begin{bmatrix} 2 & -1 \\ -1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & -1 \\ -1 & 2 \end{bmatrix} \cdot \begin{bmatrix} v_p \\ v_n \end{bmatrix}$$

wherein:
$G_e$ is a gain value, $\theta$ is a phase offset value,
$V_m$ is an output signal of a voltage loop compensator,
$d_p$ and $d_n$ are duty ratio drive signals from the control core,
$i_p$ and $i_n$ are selected line current signals from a signal selection unit,
$R_s$ is a sensing resistance for the line current signals,
$v_p$ and $v_n$ are selected voltage signals from the signal selection unit, and
p and n are valued a and c, b and c, b and a, c and a, c and b, or a and b respectively depending on the region.

11. A control core, comprising:
a reference signal selection unit that is adjustable to allow for the control of any one of a PFC, APF, VAR, or GCI converter; and an analog, digital, FPGA, microprocessor, and/or microcontroller circuitry configured to implement a control key equation to produce leading edge, trailing edge, or double edge PWM modulation signals to control a three-phase three-level power converter, wherein the control key equation is $$V_m \cdot \begin{bmatrix} 1-2 \cdot d_p \\ 1-2 \cdot d_n \end{bmatrix} = \begin{bmatrix} 2 & -1 \\ -1 & 2 \end{bmatrix} \cdot \begin{bmatrix} R_s \cdot i_p \\ R_s \cdot i_n \end{bmatrix} - G_e \cdot e^{j\theta} \cdot \begin{bmatrix} 2 & -1 \\ -1 & 2 \end{bmatrix} \cdot \begin{bmatrix} v_p \\ v_n \end{bmatrix}$$

wherein
$G_e$ is a gain value, $\theta$ is a phase offset value,
$V_m$ is an output signal of a voltage loop compensator,
$d_p$ and $d_n$ are duty ratio drive signals from the control core,
$i_p$ and $i_n$ are selected line current signals from a signal selection unit,
$R_s$ is a sensing resistance for the line current signals,
$v_p$ and $v_n$ are selected voltage signals from the signal selection unit, and
p and n are valued a and c, b and c, b and a, c and a, c and b, or a and b respectively depending on the region.

12. A control core, comprising:
a reference signal selection unit that is adjustable to allow for the control of any one of a PFC, APF, VAR, or GCI converter; and an analog, digital, FPGA, microprocessor, and/or microcontroller circuitry configured to implement a control key equation to produce leading edge, trailing edge, or double edge PWM modulation signals to control a three-phase three-level power converter, wherein the control key equation is $$V_m \cdot \begin{bmatrix} 1-d_p/2 \\ 1-d_n \end{bmatrix} = \frac{1}{2} \cdot \begin{bmatrix} 2 & 1 \\ 1 & 2 \end{bmatrix} \cdot \begin{bmatrix} R_s \cdot i_p \\ R_s \cdot i_n \end{bmatrix} - \frac{G_e \cdot e^{j\theta}}{2} \cdot \begin{bmatrix} 2 & 1 \\ 1 & 2 \end{bmatrix} \cdot \begin{bmatrix} v_p \\ v_n \end{bmatrix}$$

wherein
$G_e$ is a gain value, $\theta$ is a phase offset value,
$V_m$ is an output signal of a voltage loop compensator,
$d_p$ and $d_n$ are duty ratio drive signals from the control core,
$i_p$ and $i_n$ are selected line current signals from a signal selection unit,
$R_s$ is a sensing resistance for the line current signals,
$v_p$ and $v_n$ are selected voltage signals from the signal selection unit, and
p and n are valued a and c, b and c, b and a, c and a, c and b, or a and b respectively depending on the region.

* * * * *